United States Patent
Troy et al.

(10) Patent No.: US 10,574,040 B2
(45) Date of Patent: Feb. 25, 2020

(54) CABLE STRIPPER HAVING AN ADJUSTABLE BUSHING

(71) Applicant: Greenlee Textron Inc., Rockford, IL (US)

(72) Inventors: Andrew Francis Troy, West Dundee, IL (US); John Russell Fenske, Machesney Park, IL (US)

(73) Assignee: GREENLEE TOOLS, INC., Rockford, IL (US)

(*) Notice: Subject to any disclaimer, the term of this patent is extended or adjusted under 35 U.S.C. 154(b) by 170 days.

(21) Appl. No.: 15/891,502

(22) Filed: Feb. 8, 2018

(65) Prior Publication Data

US 2018/0166867 A1 Jun. 14, 2018

Related U.S. Application Data

(63) Continuation-in-part of application No. 14/818,616, filed on Aug. 5, 2015, now Pat. No. 9,929,548.

(51) Int. Cl.
| | |
|---|---|
| *H02G 1/12* | (2006.01) |
| *H01R 43/05* | (2006.01) |
| *B26D 7/26* | (2006.01) |
| *H02G 1/00* | (2006.01) |
| *B26D 1/02* | (2006.01) |

(Continued)

(52) U.S. Cl.
CPC ............. *H02G 1/1265* (2013.01); *B26D 1/02* (2013.01); *B26D 3/282* (2013.01); *B26D 7/26* (2013.01); *B26D 7/2642* (2013.01); *H01R 43/05* (2013.01); *H02G 1/005* (2013.01); *H02G 1/127* (2013.01); *H01R 43/28* (2013.01)

(58) Field of Classification Search
CPC ...... H02G 1/12; H02G 1/1202; H02G 1/1204; H02G 1/1221; H02G 1/1224; H02G 1/1226
See application file for complete search history.

(56) References Cited

U.S. PATENT DOCUMENTS

| | | |
|---|---|---|
| 2,419,511 A | 4/1947 | Vaughan, Jr. |
| 3,710,654 A | 1/1973 | Halverson et al. |

(Continued)

OTHER PUBLICATIONS

GTS-1930 Saber Cable Stripper Brochure, Oct. 2014, 4 pages.
GTS-1930 Cable Stripper Instruction Manual, 2015, 12 pages.

*Primary Examiner* — Stephen Choi
(74) *Attorney, Agent, or Firm* — Klintworth & Rozenblat IP LLP

(57) ABSTRACT

A cable stripper is provided which has an adjustable bushing which can be adjusted to accept a variety of differently size cables. The cable stripper is rotated around the cable to strip the insulation from a cable. The cable stripper can be attached to an existing tool to impact rotation of the cable stripper around the cable. The cable stripper includes a bushing having an axial passageway and a plurality of spaced slots which are in communication with the passageway, a plurality of cable retention blocks attached to the bushing, and a blade member mounted on the bushing, the blade member being seated within the passageway. The cable retention blocks are moveable relative to the bushing to pass through the slots and into the passageway to engage the cable mounted within the passageway. A retaining assembly is mounted on the bushing and fixes the position of the cable retention blocks relative to the bushing.

16 Claims, 16 Drawing Sheets

(51) Int. Cl.
*B26D 3/28* (2006.01)
*H01R 43/28* (2006.01)

(56) References Cited

U.S. PATENT DOCUMENTS

| | | |
|---|---|---|
| 3,769,705 A | 11/1973 | Biddle |
| 3,869,791 A | 3/1975 | Horrocks |
| 4,449,298 A | 5/1984 | Putz |
| 5,669,276 A | 9/1997 | Spacek |
| 6,334,253 B1 | 1/2002 | Cheng |
| 6,467,171 B2 | 10/2002 | Tarpill |
| 7,243,429 B2 | 7/2007 | Landes et al. |
| 2004/0045165 A1 | 3/2004 | Russell |
| 2010/0269637 A1* | 10/2010 | Wirth .................. H02G 1/1226 81/9.51 |

* cited by examiner

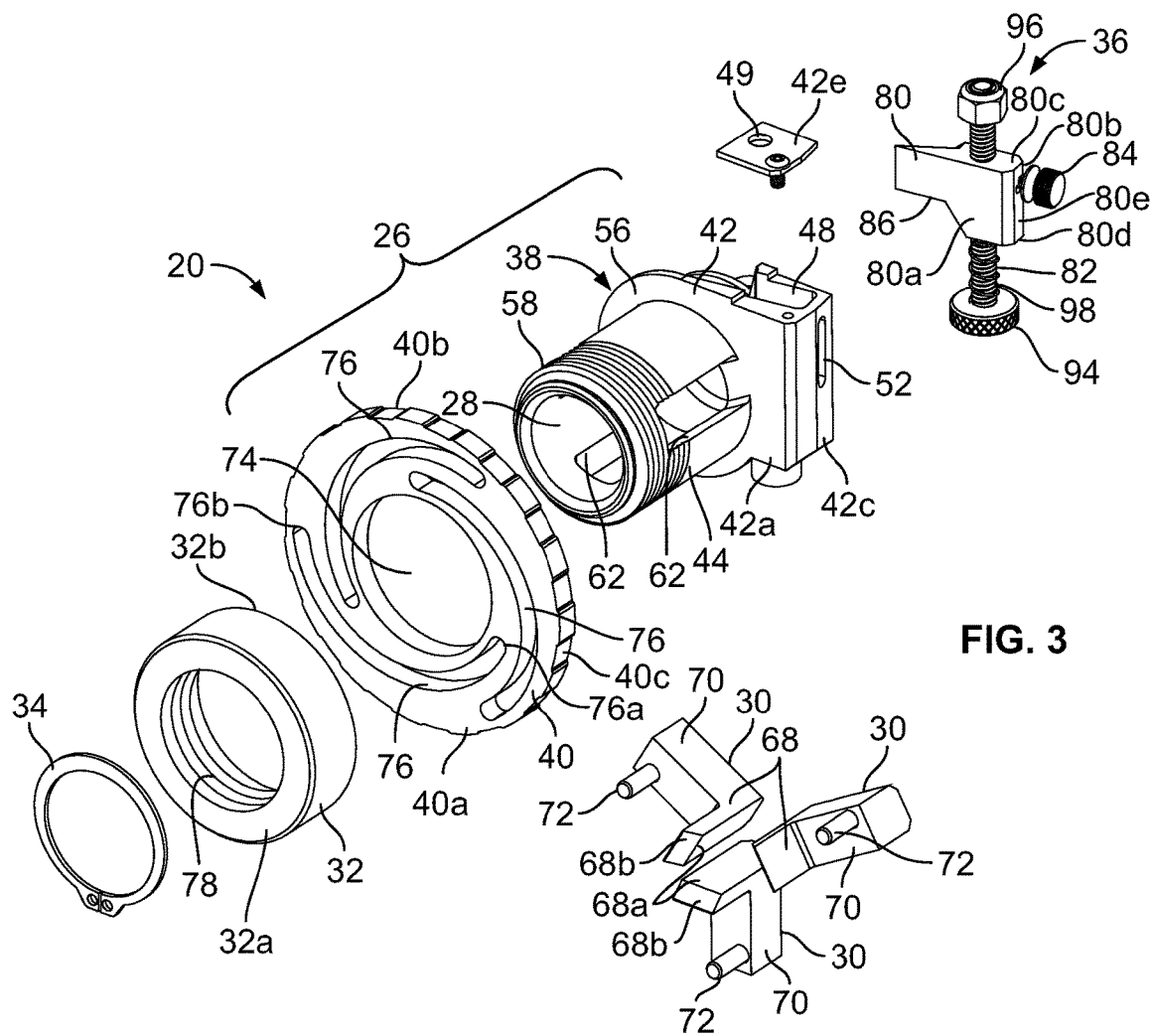
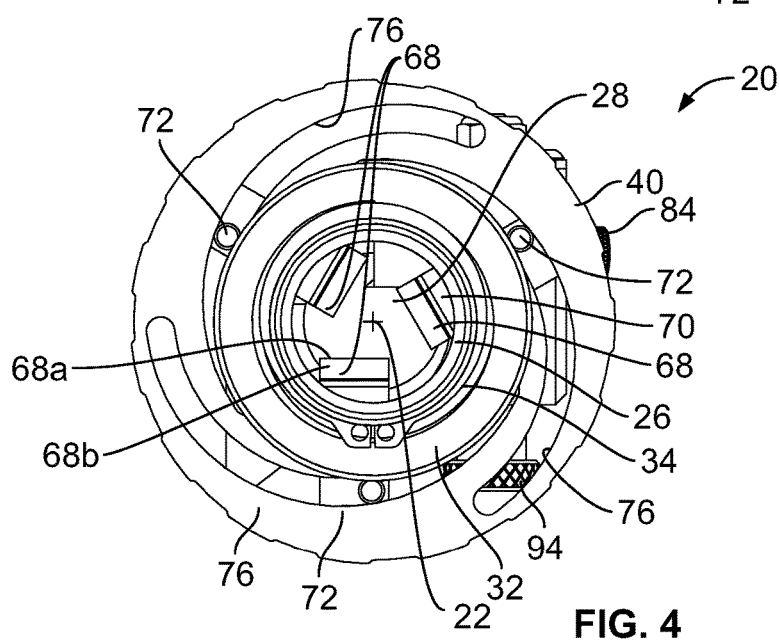

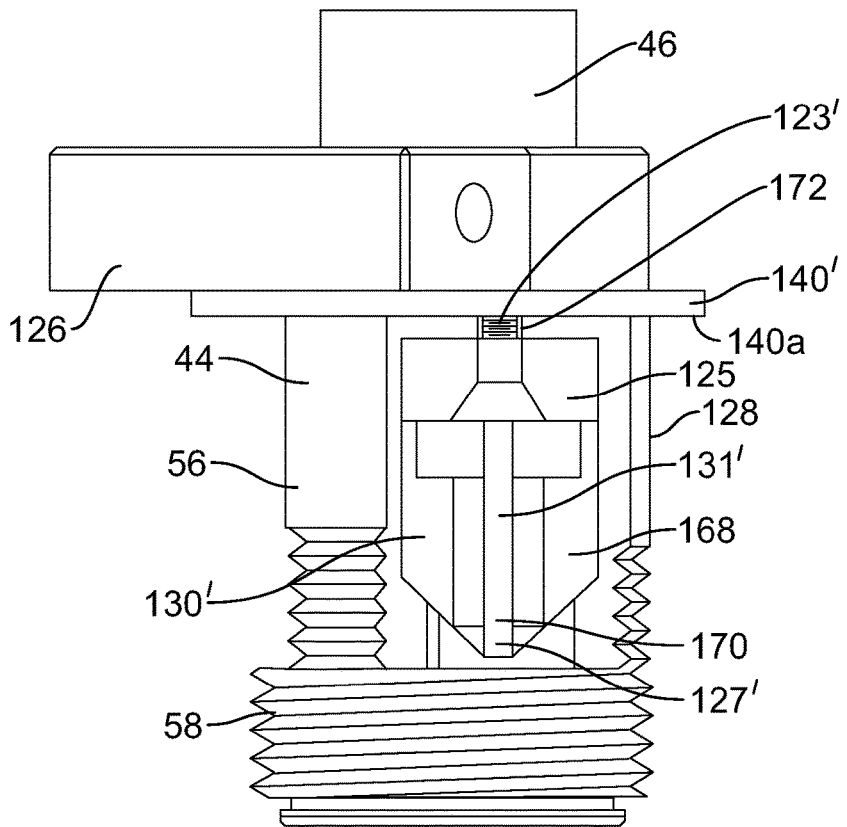
FIG. 18
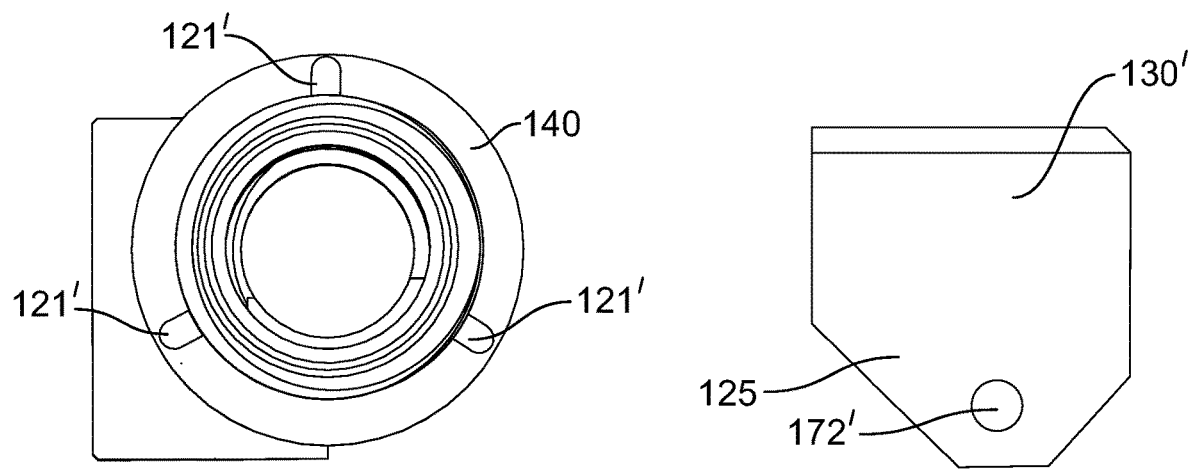
FIG. 19   FIG. 20

US 10,574,040 B2

CABLE STRIPPER HAVING AN ADJUSTABLE BUSHING

CROSS-REFERENCE TO RELATED APPLICATIONS

This application is a continuation-in-part application of Ser. No. 14/818,616, filed on Aug. 5, 2015, the contents of which are incorporated herein in its entirety.

FIELD OF THE DISCLOSURE

The present disclosure relates to cable stripping, and relates specifically to a bushing that is adjustable so the bushing can accept cables of varying outer diameters and insulation thicknesses, while still having the ability to connect to existing tools used in the field of cable stripping.

BACKGROUND

In the field of cable stripping, bushings with attached blades are used to attach to tools that facilitate the rotation of the bushing around the cable. Ratcheting handles and adapters for drills are two examples of tools to which these bushings can connect. Each bushing must be individually chosen to match the size of the cable diameter the user wishes to strip.

End users had to own the exact sized bushing that matches the size of the cable the user wanted to strip the insulation/jacket. As a result, users would need a kit of many different bushings to strip the insulation/jacket from a variety of cable sizes and types.

SUMMARY

A cable stripper is provided which has an adjustable bushing which can be adjusted to accept a variety of differently size cables. The cable stripper is rotated around the cable to strip the insulation from a cable. The cable stripper can be attached to an existing tool to impact rotation of the cable stripper around the cable. The cable stripper includes a bushing having an axial passageway and a plurality of spaced slots which are in communication with the passageway, a plurality of cable retention blocks attached to the bushing, and a blade member mounted on the bushing, the blade member being seated within the passageway. The cable retention blocks are movable relative to the bushing to pass through the slots and into the passageway to engage the cable mounted within the passageway. A retaining assembly is mounted on the bushing and fixes the position of the cable retention blocks relative to the bushing.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages of various disclosed embodiments will become apparent from the following detailed description taken in conjunction with the accompanying drawings which illustrate, by way of example, the principles of the described embodiments.

BRIEF DESCRIPTION OF THE DRAWINGS

The organization and manner of the structure and operation of the disclosed embodiments, together with further objects and advantages thereof, may best be understood by reference to the following description, taken in connection with the accompanying drawings, which are not necessarily drawn to scale, wherein like reference numerals identify like elements in which:

FIG. 3 is an exploded front perspective view of the cable stripper of FIG. 1;
FIG. 4 is a front elevation view of the cable stripper of FIG. 1;
FIG. 18 is a top plan view of an alternate cable retention block and bushing which may be used in the cable stripper of FIG. 10;
FIG. 19 is front elevation view of the bushing of FIG. 18;
FIG. 20 is a rear elevation view of the cable retention block of FIG. 18.

DETAILED DESCRIPTION

Figure 1:
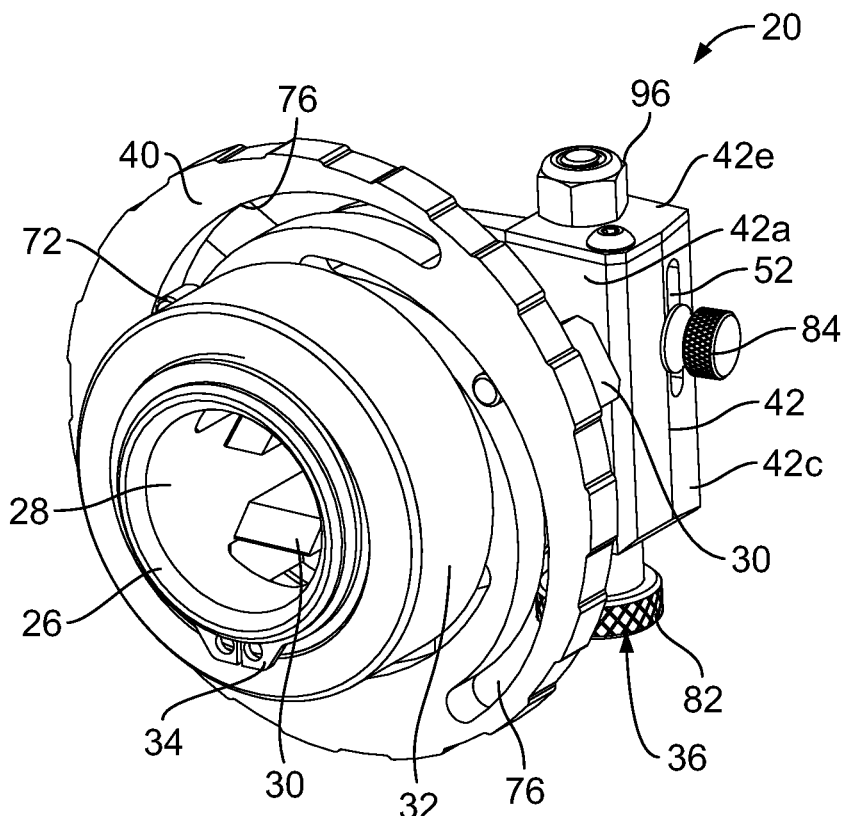
FIG. 1 is a front perspective view of a cable stripper.
Figure 2:
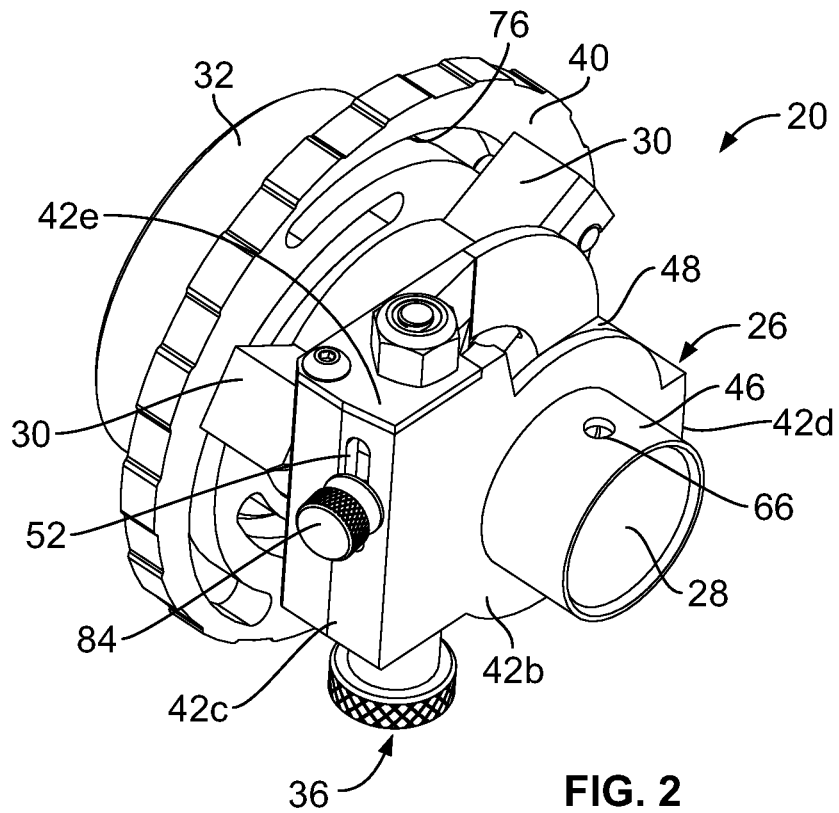
FIG. 2 is a rear perspective view of the cable stripper of FIG. 1.
Figure 7:
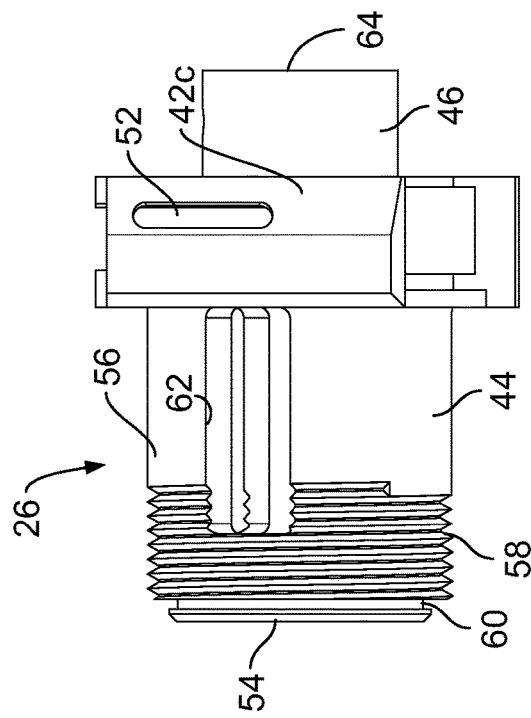
FIG. 7 is a side elevation view of the bushing of FIG. 5.
Figure 5:
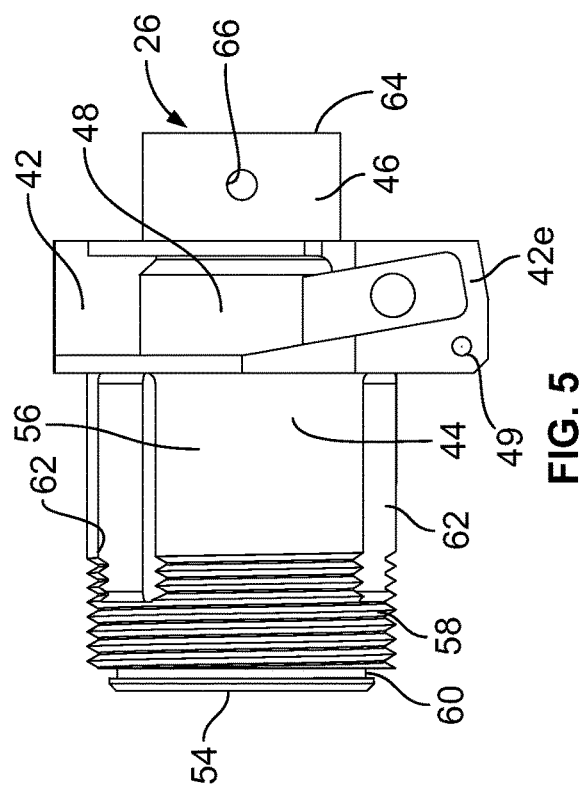
FIG. 5 is a top plan view of a bushing of the cable stripper of FIG. 1.
Figure 6:
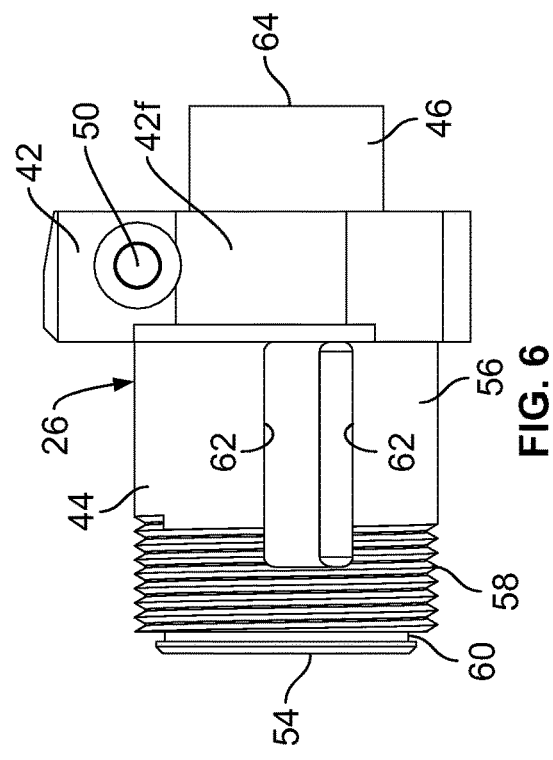
FIG. 6 is a bottom plan view of the bushing of FIG. 5.
Figure 8:
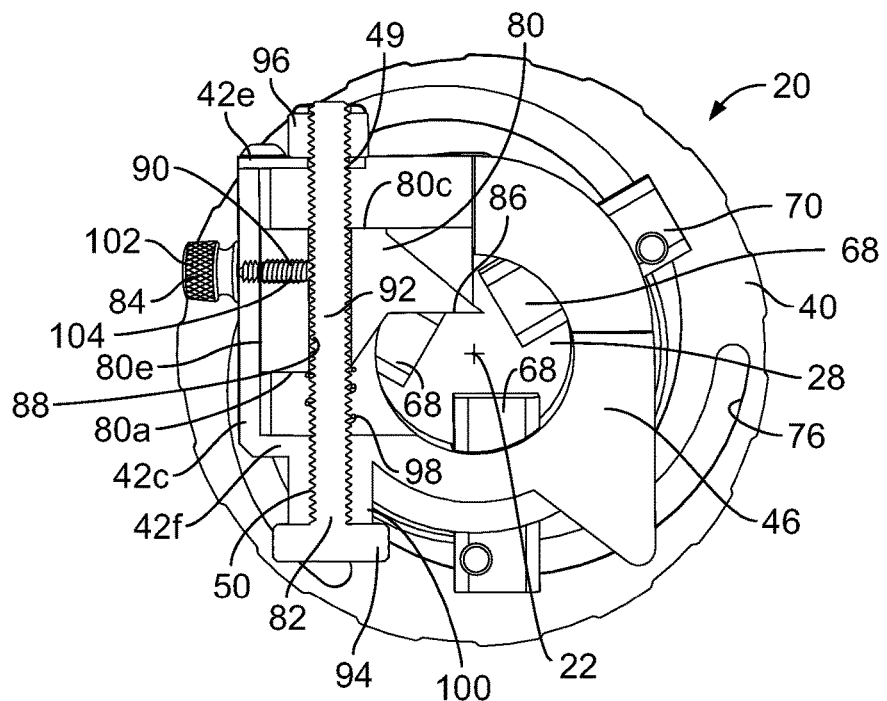
FIG. 8 is a cross-sectional view of the cable stripper of FIG. 1.

A cable stripper 20, 120, 120', 220 is provided which is used to strip the insulation/jacket from a cable (not shown). The cable stripper 20, 120, 120', 220 centers the cable and aligns the axis of the cable with a rotational axis 22 of the cable stripper 20, 120, 120', 220. The rotational axis 22 of the cable stripper 20, 120, 120', 220 is capable of aligning with an existing tool 24, such as ratcheting handles and adapters for drills, that is attached to the cable stripper 20, 120, 120', 220. Examples of such existing tools 24 are the Greenlee GTS-1930 and the Greenlee GTSD-1930. The existing tool 24 enables a user to provide a rotational motion to the cable stripper 20, 120, 120', 220 relative to the cable. This allows the existing tools 24 to impart a rotational motion to the cable stripper 20, 120, 120', 220 because the existing tools 24 are rotating in the same axis as the stationary cable. The terms upper, lower, front, back and the like are used for ease in describing the cable stripper 20, 120, 120', 220 and do not denote a required orientation for use.

FIGS. 1-8 show the cable stripper 20 which includes a bushing 26 having a central passageway 28, cable retention blocks 30 mounted on the bushing 26 and capable of moving relative to the bushing 26, a locking ring 32 and a retaining ring 34 mounted on the bushing 26, and a blade position adjustment mechanism 36 mounted on the bushing 26. The rotational axis 22 is defined through the center of the passageway 28. The bushing 26 is formed of a housing 38 and a mounting plate 40 rotatably mounted on the housing 38.

The housing 38 includes a blade mount 42 having a forward shaft 44 extending from a front end, and a rearward shaft 46 extending from a second, rear end of the blade mount 42. The passageway 28 extends through the forward shaft 44, the blade mount 42 and the rearward shaft 46. The rearward shaft 46 is attached to the existing tool 24.

As shown by way of example, the blade mount 42 is formed from front and rear walls 42a, 42b which are joined together by side walls 42c, 42d, a top wall 42e and a bottom wall 42f. A portion of the top end of the blade mount 42 is open such that a slot 48 is formed between the front, rear and side and top walls 42a, 42b, 42c, 42d, 42e. The slot 48 is in communication with the passageway 28. As shown by way of example, the top wall 42e is formed as a separate plate attached to the front, rear and side and top walls 42a, 42b, 42c, 42d so that the blade position adjustment mechanism 36 can be assembled with the mount 42. An aperture 49 is formed through the top wall 42e and is in communication with the passageway 28. A aperture 50 is formed through the bottom wall 42f and is in communication with the passageway 28. The side wall 42c has an elongated slot 52 formed therethrough and is in communication with the passageway 28.

The forward shaft 44 is cylindrical and has a rearward end which is connected to the front wall 42a and which extends forwardly from the front wall 42a. The forward shaft 44 ends in a front, free end 54. The forward shaft 44 has an unthreaded portion 56 extending outwardly from the front wall 42a, a threaded portion 58 extending outwardly from the unthreaded portion 56, and a groove 60 provided at the end of the threaded portion 58. A plurality of spaced apart slots 62 extend through the forward shaft 44. The slots 62 start at the end of the rearward end of the forward shaft 44, extend through the unthreaded portion 56 and may extend along a section of the threaded portion 58. The slots 62 are parallel to the rotational axis 22. As shown by way of example, three slots 62 are provided and are equidistantly spaced around the forward shaft 44.

The rearward shaft 46 is cylindrical and has a forward end which is connected to the rear wall 42b and which extends rearwardly from the rear wall 42b. The rearward shaft 46 ends in a rear, free end 64. The rearward shaft 46 is unthreaded, but may have aperture 66 therethrough which communicates with the passageway 28.

Respective cable retention blocks 30 seat within respective ones of the slots 62 through the bushing 26 and extend into the passageway 28. Each cable retention block 30 may be identically formed. As shown by way of example, each cable retention block 30 is formed as a generally L-shaped member with a gripping portion 68 and an attachment portion 70 which is perpendicular to the gripping portion 68. The gripping portion 68 includes an inner face 68a for gripping the cable. The inner face 68a of the gripping portion 68 may be planar or may take other shapes which are suitable for gripping the cable. A front face 68b of each gripping portion 68 may be beveled. The attachment portion 70 extends perpendicularly from the gripping portion 68 and has a pin 72 extending therefrom. The pins 72 may be integrally formed with the cable retention blocks 30, or may be formed as a separate members and attached to the attachment portions 70. It will be appreciated that the illustrated L-shaped form factor of the cable retention blocks 30 is provided by way of example, and the shape of the cable retention blocks 30 may take any of a variety of alternative forms. For example, one or more cable retention blocks 30 may be formed of a cube with a pin extending outwardly therefrom.

To assemble the cable retention blocks 30 with the bushing 26, each gripping portion 68 is inserted through a respective slot 62 until the attachment portion 70 seats within the slot 62 and the gripping portion 68 is within the passageway 28. The attachment portion 70 may engage the wall that forms the respective slot 62.

The mounting plate 40 is mounted on the unthreaded portion 56 of the forward shaft 44 and the pins 72 on the cable retention blocks 30 engage with the mounting plate 40. The mounting plate 40 can be rotated around the forward shaft 44 and fixed into place relative to the forward shaft 44 as described herein.

The mounting plate 40 has opposite front and rear surfaces 40a, 40b and an outer edge 40c extending therebetween. As shown by way of example, the mounting plate 40 is circular, but the outer edge 40c may take other shapes, for example hexagonal. The mounting plate 40 may have structure for enabling a user to easily grip the mounting plate 40, such as knurling, steps or the like on the outer edge 40c. The mounting plate 40 has a central circular passageway 74 extending between the front and rear surfaces 40a, 40b through which the forward shaft 44 extends. A center of the passageway 74 aligns with the rotational axis 22. The mounting plate 40 further includes a plurality of curved grooves 76 which extend between the front and rear surfaces 40a, 40b. Each groove 76 commences at an inner end 76a which is radially equidistant from the center of the passageway 74 and ends at an outer end 76b which is radially equidistant from the center of the passageway 74. Each groove 76 is formed of a partial spiral. Adjacent grooves 76 partially overlap each other in a radial direction. As shown by way of example, three curved grooves 76 are provided. The inner end 76a of each groove 76 is inwardly of the outer end 76b of the adjacent groove 76. To assemble the mounting plate 40 with the forward shaft 44 and with the cable retention blocks 30, the mounting plate 40 is slid along the forward shaft 44 until the pins 72 enter into the respective grooves 76 and the rear surface 40b of the mounting plate 40 engages the forward faces of the attachment portions 70 of the cable retention blocks 30. The gripping portions 70 extend through the passageway 74.

The locking ring 32 seats on the threaded portion 58 of the forward shaft 44 such that the mounting plate 40 and cable retention blocks 30 are between the locking ring 32 and the front wall 42a of the mount 42. The locking ring 32 has a forward end 32a, a rearward end 32b and an internally threaded passageway 78 which extends from the forward end 32a to the rearward end 32b. The threaded passageway 78 mates with the threads on the threaded portion 58 of the forward shaft 44.

The retaining ring 34 seats within the groove 60 on the forward shaft 44 to prevent the release of the locking ring 32 from the bushing 26.

The blade position adjustment mechanism 36 is formed of a blade member 80, a spring-loaded fastener 82 threadedly attached to the blade member 80, and a set screw 84 threadedly attached to the blade member 80 and which interacts with the spring-loaded fastener 82.

The blade member 80 has front and rear faces 80a, 80b, with upper, lower and side faces 80c, 80d, 80e extending therebetween. A cutting edge 86 is formed on the lower face 80d. A threaded passageway 88 extends through the blade member 80 from the upper face 80c to the lower face 80d and the spring-loaded fastener 82 is mounted therein. A threaded bore 90 extends from the side face 80e inwardly and the bore 90 is in communication with the passageway 88.

The fastener 82 is formed from a threaded shaft 92 having an enlarged head 94 at an end thereof. The shaft 92 seats through the aperture 49 in the top wall 42e of the mount 42, through the threaded passageway 88 in the blade member 80, and through the aperture 50 in the bottom wall 42f of the mount 42. As such, the blade member 80 is housed within the mount 42 and the cutting edge 86 extends into the passageway 28. The top end of the shaft 92 is secured to the blade mount 42 by a nut 96. The head 94 is proximate to the bottom wall 42f. A spring 98 surrounds the shaft 92, and is between the top side of wall 42f and the lower face 80d of the blade member 80. The bottom wall 42f may have a boss 100 surrounding the shaft 92 and the spring 98.

The set screw 84 has a head 102 which is capable of engaging with the side wall 42c of the mount 42, a shaft 104 which extends through the elongated slot 52 in the mount 42 and seats within the bore 90. Set screw 84 is capable of clamping blade member 80 to wall 42c.

The positions of the gripping portions 68 of the cable retention blocks 30 are adjustable relative to the bushing 26 by rotating the mounting plate 40. In order to allow for this rotation of the mounting plate 40, the locking ring 32 is rotated around the threaded portion 58 of the bushing 26 to space the rearward end 32b of the locking ring 32 from the front surface 40a of the mounting plate 40. The mounting plate 40 is then rotated around the forward shaft 44 to move the cable retention blocks 30 radially inwardly or outwardly relative to the rotational axis 22 of the cable stripper 20. The pins 72 slide along the grooves 76 in the mounting plate 40 which causes the cable retention blocks 30 to move radially inwardly or outwardly relative to the bushing 26.

In use, the cable retention blocks 30 and the cutting edge 86 of the blade member 80 are positioned such that they do not interfere, or at least substantially interfere, with the insertion of a cable into the passageway 28 of the cable stripper 20 through the forward shaft 44. To cause the movement of the cable retention blocks 30, the locking ring 32 is rotated around the bushing 26 to disengage the locking ring 32 from the mounting plate 40. The mounting plate 40 is rotated around the forward shaft 44 which causes the pins 72 to slide along the grooves 76. This causes the cable retention blocks 30 to move radially outwardly relative to the forward shaft 44. During this radially outwardly movement, the attachment portions 70 of the cable retention blocks 30 slide through the slots 62 in the forward shaft 44. To cause the movement of the blade member 80, the set screw 84 is rotated to disengage the end from engagement with the fastener 82. The fastener 82 is then rotated which causes the blade member 80 to translate along the shaft 92 of the fastener 82.

The cable is then inserted into the passageway 28 through the forward shaft 44, past the cable retention blocks 30 and into the rearward shaft 46. The beveled faces 68b on the cable retention blocks 30 will aid in guiding the cable into the passageway 28 formed between the cable retention blocks 30 if the cable engages one or more of the cable retention blocks 30. Thereafter, the cable retention blocks 30 are moved to engage and hold the cable in the cable stripper 20. To cause the movement of the cable retention blocks 30, the mounting plate 40 is rotated in the opposite direction around the forward shaft 44 which causes the pins 72 to slide along the grooves 76. This causes the cable retention blocks 30 to move radially inwardly relative to the forward shaft 44. During this radially inwardly movement, the attachment portions 70 of the cable retention blocks 30 slide through the slots 62 in the forward shaft 44. Once the inner faces 68a of the cable retention blocks 30 engage the cable, the locking ring 32 is rotated around the threaded portion 58 of the bushing 26 to engage the rearward end 32b of the locking ring 32 against the front surface 40a of the mounting plate 40. The mounting plate 40 and cable retention blocks 30 are then clamped between the front wall 42a of the mount 42 and the rearward end 32b of the locking ring 32. This fixes the rotational position of the mounting plate 40 and fixes the radial position of the cable retention blocks 30 relative to the forward shaft 44 such that further movement of the cable retention blocks 30 is prevented in a radially inward or radially outward direction. To cause the movement of the blade member 80, the fastener 82 is then rotated in the opposite direction which causes the blade member 80 to translate linearly along the shaft 92 of the fastener 82 until the cutting edge 86 engages with the cable. The set screw 84 is then rotated to clamp blade member 80 with the wall 42c. Thereafter, the cable stripper 20 is rotated around the stationary cable to cut the insulation/jacket from the cable. As the cable stripper 20 is rotated around the stationary cable, a slight forward pressure is applied to provide the spiral cut along the length of the cable. As the cable stripper 20 rotates, the cutting edge 86 cuts into the insulation/jacket and removes it from the conductor. The removed insulation/jacket exits the cable stripper 20 via the slot 48. The passageway 28 formed by the cable retention blocks 30 holds the cable in sufficiently in place so the cutting edge 86 can maintain its position relative to the outer diameter of the cable, but the cable retention blocks 30 hold the cable loosely enough to permit rotation and axial movement of the cable relative to the cable stripper 20.

It is to be understood that the positions of the mounting plate 40 and the cable retention blocks 30 can be reversed such that the mounting plate 40 is proximate to the mount 42 and the cable retention blocks 30 are between the mounting plate 40 and the locking ring 32. The locking ring 32 can be moved to engage against the cable retention blocks 30 once the cable retention blocks 30 are positioned into a desired position to clamp the cable retention blocks 30 and the mounting plate 40 between the locking ring 32 and the mount 42.

It is to be understood that the position of the fastener 82 can be reversed such that the head 94 is proximate to the top wall 42e and the nut 96 is attached at the bottom wall 42f. Also, it is to be understood that the set screw 84 and slot 52 can be eliminated.

FIGS. 10-16 show the cable stripper 120 which includes a bushing 126 having a central passageway 128, cable retention blocks 130 mounted on the bushing 126 and extending through the bushing 126 and into the central passageway 28, a locking ring 32 and a retaining ring 34 mounted on the bushing 126, and a blade position adjustment mechanism 36 mounted on the bushing 126. The locking ring 32, retaining ring 34, and blade position adjustment mechanism 36 are identically formed to that previously described so the specifics are not repeated herein.

The bushing 126 is identically formed to that previously described such that like reference numerals are used to denote these components as were previously used, with the exception that the mounting plate 140 is proximate to the front wall of the mount 42 and affixed thereto. The mounting plate 140 may be formed separately from the forward shaft 44 and affixed thereto, or may be integrally formed with the forward shaft 44. The mounting plate 140 includes a plurality of spaced apertures 121 therethrough which are radially outwardly of the slots 62 in the bushing 126. The apertures 121 may be proximate to an outer edge 140c of the mounting plate 140.

The cable retention blocks 130 are pivotally attached to the mounting plate 140 and respective cable retention blocks 130 seat within respective ones of the slots 62 through the bushing 126 and extend into the passageway 28. Each cable retention block 130 may be identically formed. As shown by way of example, each cable retention block 130 has a gripping portion 168, an attachment portion 170 extending outwardly from the gripping portion 168, a pin 172 attached to the attachment portion 170, and a spring 123.

Each gripping portion 168 includes an inner face 168a for gripping the cable. The inner face 168a of each gripping portion 168 may be planar or may take other shapes which are suitable for gripping the cable. A front face 168b of each gripping portion 168 may be beveled.

The attachment portion 170 of each cable retention block 130 extends perpendicularly outwardly from the gripping portion 168. Each attachment portion 170 has a rearward wall 125 and a forward wall 127. The rearward wall 125 extends outwardly from a rear end of the gripping portion 168. The forward wall 127 extends forwardly from the rearward wall 125 and has an outer surface 131 which angles inwardly from the outer end 125a of the rearward wall 125 to the front of the gripping portion 168 and angles at an angle α relative to the rotational axis 22 of the cable stripper 20. The rearward wall 125 is wider than the gripping portion 168 such that a section 129 of the rearward wall 125 extends outwardly from the gripping portion 168.

The pin 172 extends through an unthreaded passageway in the section 129. The spring 123 seats between a head 173 of the pin 172 and the front of the section 129. The pin 172 may be integrally formed with the cable retention block 130, or may be formed as a separate member and attached to the attachment portion 170.

To assemble the cable retention blocks 130 with the bushing 126, each gripping portion 168 is inserted through a respective slot 62 until the attachment portion 170 seats within the slot 62 and the gripping portion 168 is within the passageway 28. The attachment portion 170 has a width which is less than the width of the slot 62 so that the cable retention blocks 130 can pivot within the respective slot 62. The pin 172 is threadedly attached to the respective aperture 121 in the mounting plate 140. In each cable retention block 130, the spring 123 engages the rearward wall 125 and engages the wall forming the slot 62 to bias the cable retention blocks 130 into an outward position such that the gripping portions 168 are withdrawn or substantially withdrawn from the passageway 28.

The locking ring 32 seats on the threaded portion 58 of the forward shaft 44 such that the cable retention blocks 130 are between the mounting plate 140 and the locking ring 32.

In use, the cable retention blocks 130 and the cutting edge 86 of the blade member 80 are positioned such that they do not interfere, or at least substantially interfere, with the insertion of a cable into the passageway 28 of the cable stripper 120 through the forward shaft 44. To cause the movement of the cable retention blocks 130, the locking ring 32 is rotated around the bushing 126 to disengage the locking ring 32 from the outer surfaces 131 of the cable retention blocks 130. Since the cable retention blocks 130 are normally biased outwardly from the rotational axis 22 by the springs 123, this causes the cable retention blocks 130 to pivot and move outwardly relative to the forward shaft 44. During this outward movement, the attachment portions 170 of the cable retention blocks 130 slide through the slots 62 in the forward shaft 44. To cause the movement of the blade member 80, the set screw 84 is rotated to release the blade member 80 from its clamped position with wall 42c. The fastener 82 is then rotated which causes the blade member 80 to translate along the shaft 92 of the fastener 82.

The cable is then inserted into the passageway 28 through the forward shaft 44, past the cable retention blocks 130 and into the rearward shaft 46. The beveled faces 168b on the cable retention blocks 130 will aid in guiding the cable into the passageway 28 formed between the cable retention blocks 130 if the cable engages one or more of the cable retention blocks 130. Thereafter, the cable retention blocks 130 are moved to engage and hold the cable in the cable stripper 120. To cause the movement of the cable retention blocks 130, the locking ring 32 is rotated in the opposite direction around the forward shaft 44 to engage the rearward end 32b of the locking ring 32 with the outer surfaces 131 of the cable retention blocks 130. Continued rotation of the locking ring 32 causes the rearward end 32b of the locking ring 32 to further engage and travel along the outer surfaces 131 of the cable retention blocks 130. This causes the cable retention blocks 130 to pivot inwardly around pins 172, such that the attachment portions 170 pivot through the slots 62 and the gripping portions 168 pivot and move inwardly to grip the cable. The cable retention blocks 130 are then clamped between the inserted cable and the rearward end 32b of the locking ring 32. This prevents further radial movement of the cable retention blocks 130 relative to the forward shaft 44 in a radially outward direction. To cause the movement of the blade member 80, the fastener 82 is then rotated in the opposite direction which causes the blade member 80 to translate linearly along the shaft 92 of the fastener 82 until the cutting edge 86 engages with the cable. The set screw 84, if provided, is the rotated to clamp blade member 80 with the inner side of wall 42c. Thereafter, the cable stripper 120 is rotated around the stationary cable to cut the insulation/jacket from the cable. As the cable stripper 120 is rotated around the stationary cable, a slight forward pressure is applied to provide the spiral cut along the length of the cable. As the cable stripper 120 rotates, the cutting edge 86 cuts into the insulation/jacket and removes it from the conductor. The removed insulation/jacket exits the cable stripper 120 via the slot 48. The passageway 28 formed by the cable retention blocks 130 holds the cable in sufficiently in place so the cutting edge 86 can maintain its position relative to the outer diameter of the cable, but the cable retention blocks 130 hold the cable loosely enough to permit rotation and axial movement of the cable relative to the cable stripper 120.

While the pins 172 are shown as attached to the attachment portion 170, it is to be understood that the pins 172 can instead be provided as part of the mounting plate 140, with the pins 172 extending through apertures in the attachment portion 170.

FIGS. 18-20 show the cable stripper 120' which is identical to that shown in FIGS. 10-16, with the exception of the differences in the mounting plate 140' and the cable retention blocks 130' described herein.

The apertures 121 of the mounting plate 140 have been eliminated and instead, the mounting plate 140' includes a plurality of spaced apart elongated slots 121' therethrough. The slots 121' extend radially outwardly from the unthreaded portion 56 of the forward shaft 44.

The sections 129 of the cable retention blocks 130 of the cable stripper 120 have been eliminated and the pin 172 extends outwardly and rearwardly from the rearward wall 125 of the attachment portion 170 and seats within a respective slot 121' in the mounting plate 140. A spring 123' is attached between the rearward wall 125 of the attachment portion 170 and the front surface 140a of the mounting plate 140 and may be mounted radially outwardly of the pin 172. The spring 123' biases each cable retention block 130' into a radially outward position relative to the rotational axis 22 of the cable stripper 120' such that the inner face 168a is radially outward of the passageway 28. The forward wall 127' of each attachment portion 170 extends forwardly from the rearward wall 125 and has an outer surface 131' which angles inwardly from the outer end 125a of the rearward wall 125 to the front of the gripping portion 168 and is parallel to the rotational axis 22 of the cable stripper 120'.

To assemble the cable retention blocks 130' with the bushing 126, each gripping portion 168 is inserted through a respective slot 62 until the attachment portion 170 seats within the slot 62 and the gripping portion 168 is within the passageway 28. The pins 172 are slideably mounted within the respective slot 121' in the mounting plate 140. In each cable retention block 130', the spring 123 biases the cable retention blocks 130' into an outward position such that the gripping portions 168 are withdrawn or substantially withdrawn from the passageway 28.

The locking ring 32 seats on the threaded portion 58 of the forward shaft 44 such that the cable retention blocks 130' are between the mounting plate 140 and the locking ring 32.

In use, the cable retention blocks 130' and the cutting edge 86 of the blade member 80 are positioned such that they do not interfere, or at least substantially interfere, with the insertion of a cable into the passageway 28 of the cable stripper 120' through the forward shaft 44. To cause the movement of the cable retention blocks 130', the locking ring 32 is rotated around the bushing 126 to disengage the locking ring 32 from the outer surfaces 131' of the cable retention blocks 130'. Since the cable retention blocks 130' are normally biased outwardly from the axis 22 by the springs 123', this causes the cable retention blocks 130' to move radially outwardly relative to the forward shaft 44. During this outward movement, the attachment portions 170 of the cable retention blocks 130' slide through the slots 62 in the forward shaft 44. To cause the movement of the blade member 80, the set screw 84 is rotated to disengage the clamping of blade member 80 with wall 42c. The fastener 82 is then rotated which causes the blade member 80 to translate along the shaft 92 of the fastener 82.

The cable is then inserted into the passageway 28 through the forward shaft 44, past the cable retention blocks 130' and into the rearward shaft 46. The beveled faces 168b on the cable retention blocks 130' will aid in guiding the cable into the passageway 28 formed between the cable retention blocks 130' if the cable engages one or more of the cable retention blocks 130'. Thereafter, the cable retention blocks 130' are moved to engage and hold the cable in the cable stripper 120'. To cause the movement of the cable retention blocks 130', the locking ring 32 is rotated in the opposite direction around the forward shaft 44 to engage the rearward surface 32b of the locking ring 32 with the outer surfaces 131' of the cable retention blocks 130'. Continued rotation of the locking ring 32 causes the rearward end 32b of the locking ring 32 to further engage and travel along the outer surfaces 131' of the cable retention blocks 130'. This causes the cable retention blocks 130' to move radially inwardly with the pin 172' sliding along the slot 121', such that the attachment portions 170' slide through the slots 62 and the gripping portions 168 move radially inwardly to grip the cable. The cable retention blocks 130' are then clamped between the front surface 140a of the mounting plate 140 and the rearward end 32b of the locking ring 32. This prevents further radial movement of the cable retention blocks 130' relative to the forward shaft 44 in a radially outward direction. To cause the movement of the blade member 80, the fastener 82 is then rotated in the opposite direction which causes the blade member 80 to translate linearly along the shaft 92 of the fastener 82 until the cutting edge 86 engages with the cable. The set screw 84, if provided, is the rotated to clamp blade member 80 with the inner side of wall 42c. Thereafter, the cable stripper 120' is rotated around the stationary cable to cut the insulation/jacket from the cable. As the cable stripper 120' is rotated around the stationary cable, a slight forward pressure is applied to provide the spiral cut along the length of the cable. As the cable stripper 120' rotates, the cutting edge 86 cuts into the insulation/jacket and removes it from the conductor. The removed insulation/jacket exits the cable stripper 120' via the slot 48. The passageway 28 formed by the cable retention blocks 130' holds the cable in sufficiently in place so the cutting edge 86 can maintain its position relative to the outer diameter of the cable, but the cable retention blocks 130' hold the cable loosely enough to permit rotation and axial movement of the cable relative to the cable stripper 120'.

While the pins 172 are shown as being provided on the cable retention blocks 130' and the slots 121' are provided on the mounting plate 140', it is to be understood that the pins 172 can be instead provided on the mounting plate 140' and the slots 121' are provided on the cable retention blocks 130'.

FIGS. 21-26 show the cable stripper 220 which includes a bushing 226 having a central passageway 228, cable retention blocks 230 mounted on the bushing 226 and capable of moving relative to the bushing 226, a retaining assembly 306 mounted on the bushing 226, and a blade position adjustment mechanism 236 mounted on the bushing 226. The rotational axis 222 is defined through the center of the passageway 228.

The bushing 226 is formed of a housing 238 and a mounting plate 240 rotatably mounted on the housing 238.

The housing 238 includes a blade mount 242 having a forward shaft 244 extending from a front end, and a rearward shaft 246 extending from a second, rear end of the blade mount 242. The passageway 228 extends through the forward shaft 244, the blade mount 242 and the rearward shaft 246. The rearward shaft 246 is attached to the existing tool 24.

As shown by way of example, the blade mount 242 is formed from front and rear walls 242a, 242b which are joined together by walls 242c. A portion of the top end of the blade mount 242 is open such that a slot 248 is formed through wall 242c. The slot 248 is in communication with the passageway 228. An aperture 250 is formed through the wall 242c and is in communication with the passageway 228.

The forward shaft 244 is cylindrical and has a rearward end which is connected to the front wall 242a and which extends forwardly from the front wall 242a. The forward shaft 244 ends in a front, free end 254. The forward shaft 244 has an unthreaded portion 256 extending outwardly from the front wall 242a and a threaded portion 258 extending outwardly from the unthreaded portion 256 to the free end 254. A plurality of spaced apart slots 262 extend through the forward shaft 244. The slots 262 have a forward end 262a at the free end 254 of the forward shaft 244 and a rear end 262b at the rear end of the forward shaft 244. The slots 262 are parallel to the rotational axis 222. As shown by way of example, three slots 262 are provided and are equidistantly spaced around the forward shaft 244.

The rearward shaft 246 is cylindrical and has a forward end which is connected to the rear wall 242b and which extends rearwardly from the rear wall 242b. The rearward shaft 246 ends in a rear, free end 264. The rearward shaft 246 is unthreaded, but may have aperture 266 therethrough which communicates with the passageway 228 which is used to lock the cable stripper 220 axially and rotationally to the existing tool 24.

Respective cable retention blocks 230 seat within respective ones of the slots 262 through the bushing 226 and extend into the passageway 228. Each cable retention block 230 may be identically formed. As shown by way of example, each cable retention block 230 is formed as a generally L-shaped member with a gripping portion 268 and an attachment portion 270 which is perpendicular to the gripping portion 268. The gripping portion 268 includes an inner face 268a for gripping the cable. The inner face 268a of the gripping portion 268 may be curved as shown, may be planar, or may take other shapes which are suitable for gripping the cable. A front face 268b of each gripping portion 268 may be beveled. The attachment portion 270 extends perpendicularly from the gripping portion 268 and has a pin 272 extending therefrom. The pins 272 may be integrally formed with the cable retention blocks 230, or may be formed as separate members and attached to the attachment portions 270. It will be appreciated that the illustrated L-shaped form factor of the cable retention blocks 230 is provided by way of example, and the shape of the cable retention blocks 230 may take any of a variety of alternative forms. For example, one or more cable retention blocks 230 may be formed of a cube with a pin extending outwardly therefrom.

To assemble the cable retention blocks 230 with the bushing 226, each gripping portion 268 is inserted into a respective slot 262 until the attachment portion 270 seats within the slot 262 and the gripping portion 268 is within the passageway 228. The respective gripping portion 268 abuts the rear end 262b of the respective slot 262. The attachment portion 270 may engage the wall that forms the respective slot 262.

The mounting plate 240 is mounted on the unthreaded portion 256 of the forward shaft 244 and the pins 272 on the cable retention blocks 230 engage with the mounting plate 240. The gripping portion 268 abut against a rear surface 240b of the mounting plate 240. The mounting plate 240 can be rotated around the forward shaft 244 and fixed into place relative to the forward shaft 244 as described herein.

The mounting plate 240 has opposite front and rear surfaces 240a, 240b and an outer edge 240c extending therebetween. The front surface 240a is planar, and the rear surface 240b may be planar. As shown by way of example, the outer edge 240c falls on an imaginary circular such that the mounting plate 240 is circular, but the outer edge 240c may take other shapes, for example hexagonal. The mounting plate 240 may have structure for enabling a user to easily grip the mounting plate 240, such as knurling, steps or the like on the outer edge 240c. The mounting plate 240 has a central circular passageway 274 extending between the front and rear surfaces 240a, 240b through which the forward shaft 244 extends. A center of the passageway 274 aligns with the rotational axis 222. The mounting plate 240 further includes a plurality of curved grooves 276 which extend between the front and rear surfaces 240a, 240b. Each groove 276 commences at an inner end 276a which is radially equidistant from the center of the passageway 274 and ends at an outer end 276b which is radially equidistant from the center of the passageway 274. Each groove 276 is formed of a partial spiral. Adjacent grooves 276 partially overlap each other in a radial direction. As shown by way of example, three curved grooves 276 are provided. The inner end 276a of each groove 276 is inwardly of the outer end 276b of the adjacent groove 276. To assemble the mounting plate 240 with the forward shaft 244 and with the cable retention blocks 230, the mounting plate 240 is slid along the forward shaft 244 until the pins 272 enter into the respective grooves 276 and the rear surface 240b of the mounting plate 240 engages the forward faces of the attachment portions 270 of the cable retention blocks 230. The gripping portions 270 extend through the passageway 274.

The retaining assembly 306 is mounted on the forward shaft 244 of the housing 238. The retaining assembly 306 includes a flat washer 308 which acts a shim and is engaged against the mounting plate 240, a spring 310 forward of the washer 308, a spring support 312 forward of the spring 310, and a lock 314 forward of the spring support 312.

The flat washer 308 has a planar front face 308a, a planar rear face 308b, and a passageway 308c extending therethrough. The washer 308 seats around the unthreaded portion 256 of the forward shaft 244 such that the forward shaft 244 extends through the passageway 308c, and the planar rear face 308b of the washer 308 abuts against the planar front surface 240a of the mounting plate 240. In an embodiment, the washer 308 is circular.

Figure 23:
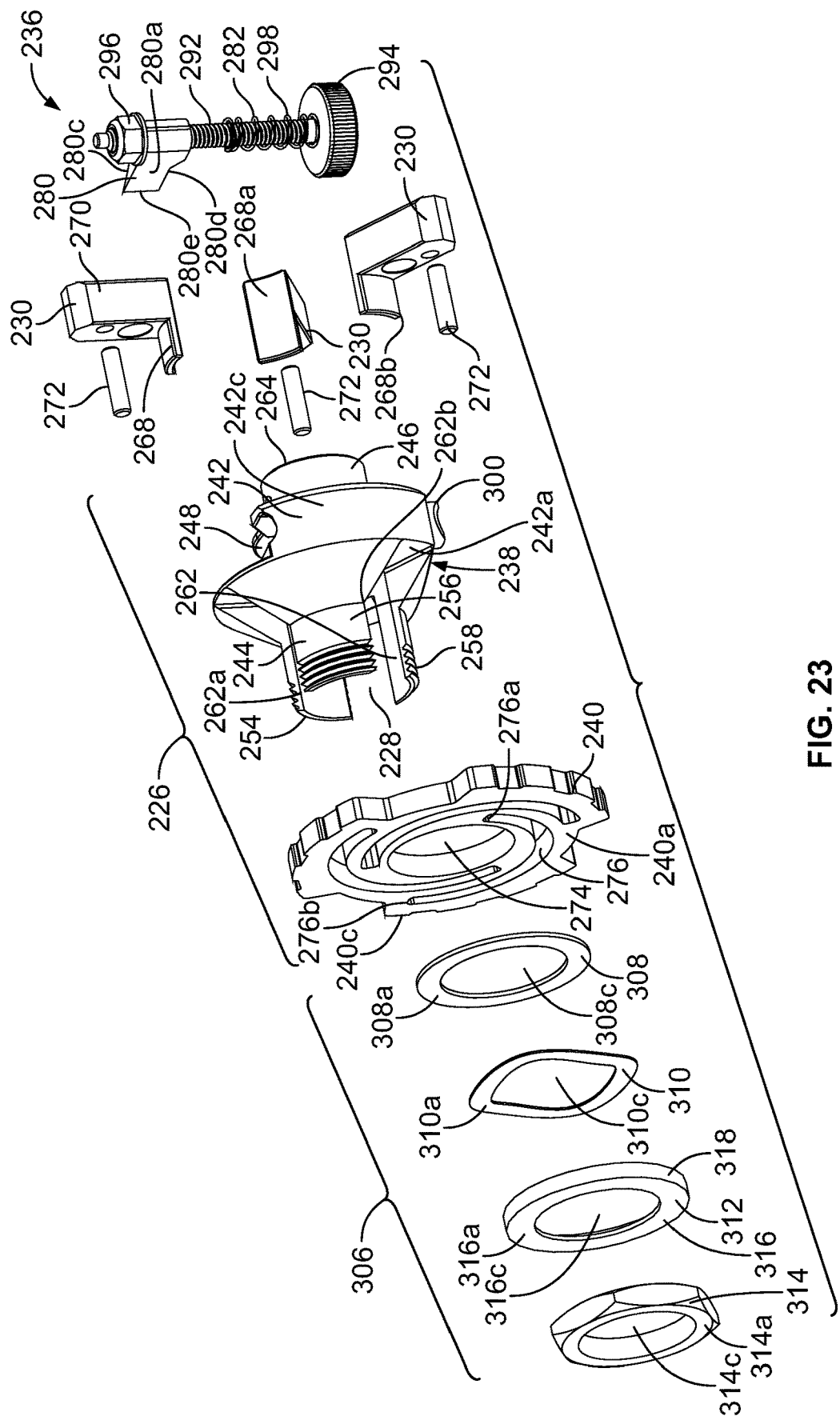
FIG. 23 is an exploded front perspective view of the cable stripper of FIG. 21.
Figure 23A:
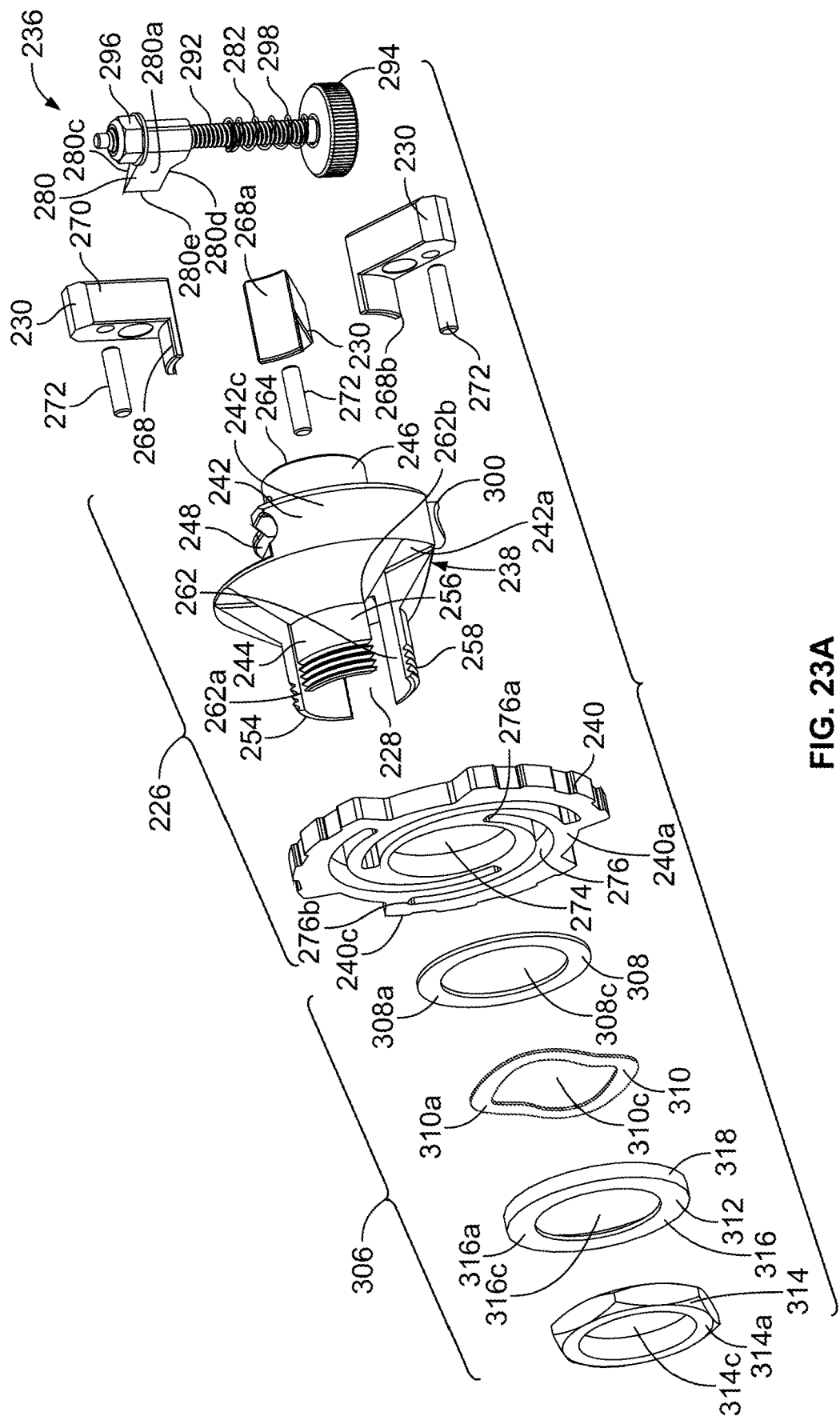
FIG. 23A is an exploded front perspective view of the cable stripper of FIG. 21, but showing a spring thereof as a wave spring.
Figure 24:
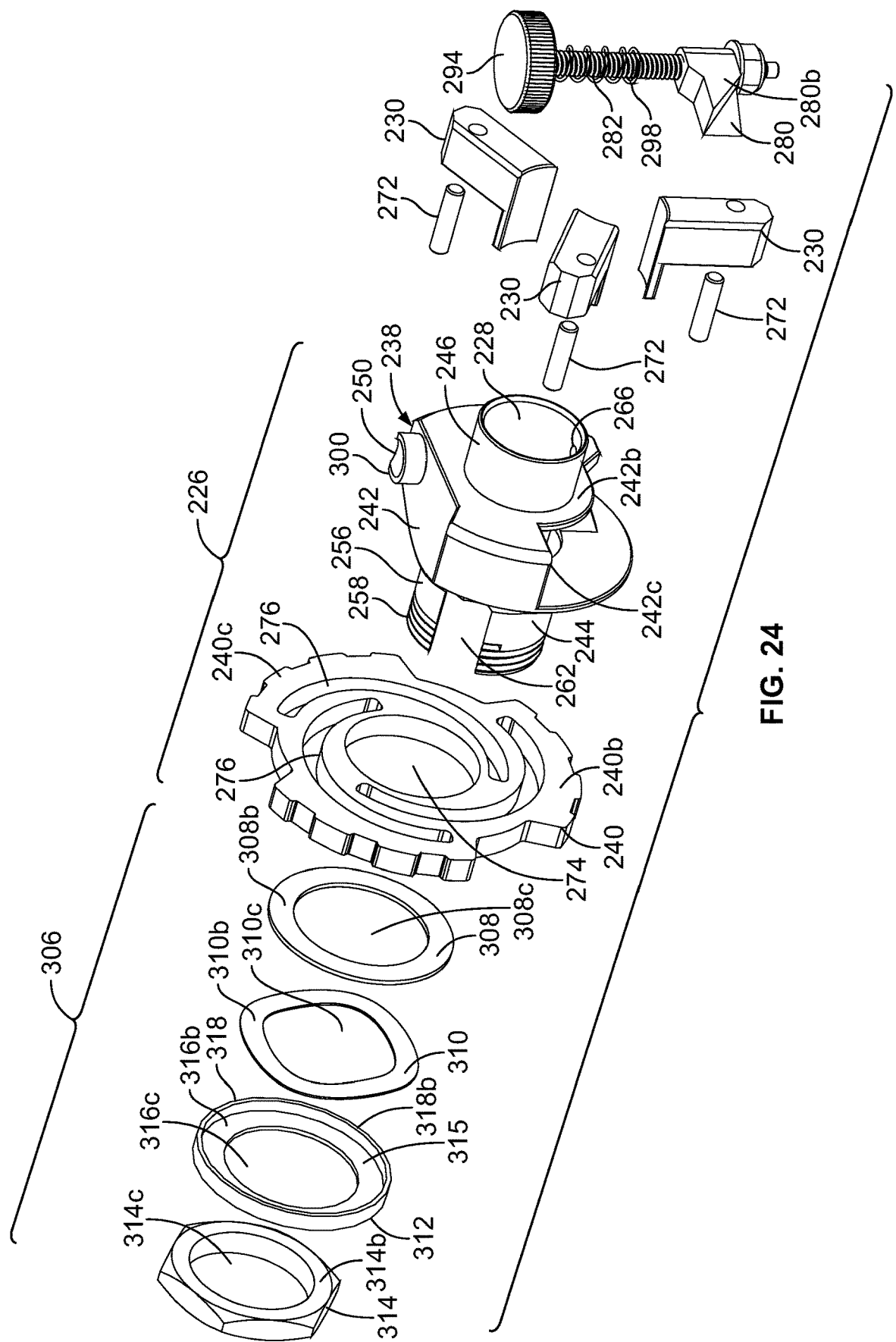
FIG. 24 is an exploded rear perspective view of the cable stripper of FIG. 21.
Figure 25:
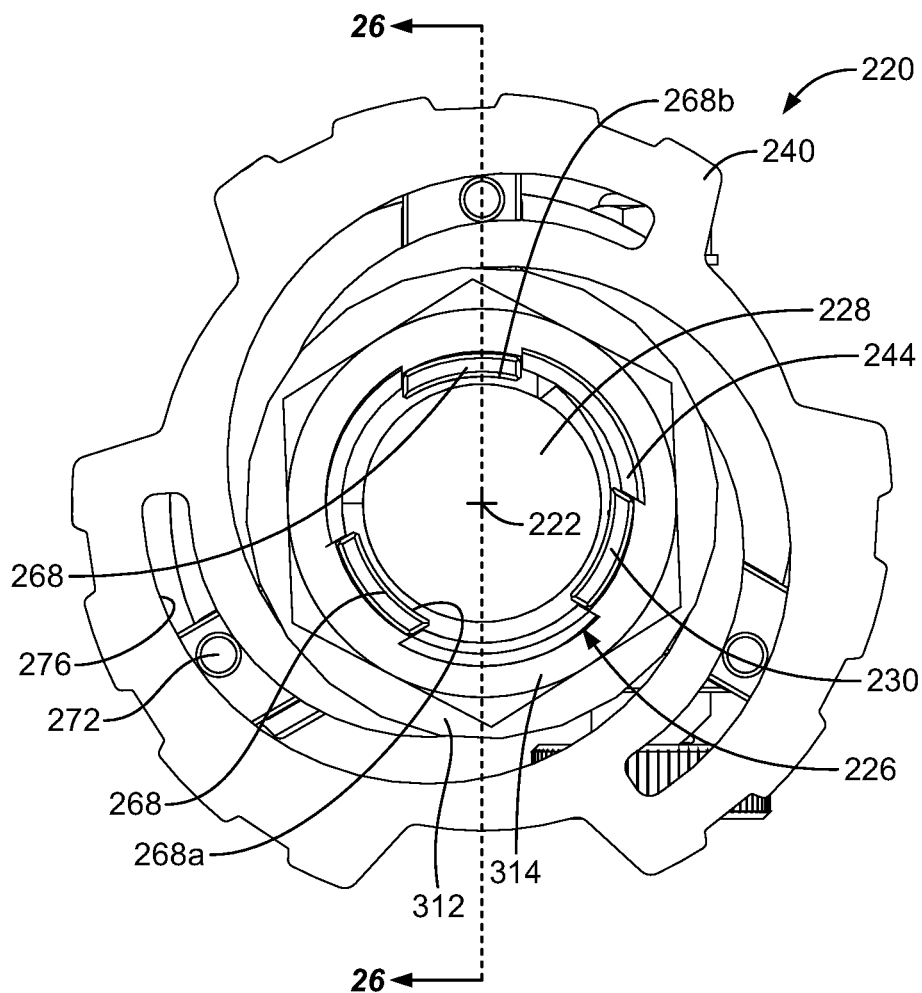
FIG. 25 is a front elevation view of the cable stripper of FIG. 21.

The spring 310 has a front face 310a, a rear face 310b, and a passageway 310c extending therethrough. The spring 310 seats around the unthreaded portion 256 of the forward shaft 244 such that the forward shaft 244 extends through the passageway 310c, and the rear face 310b of the spring 310 abuts against the front face 308a of the washer 308. In an embodiment, the spring 310 is a wave spring as shown in FIG. 23A. In an embodiment, the spring 310 is a compressible elastomeric member which may be formed as a ring. In an embodiment, the spring 310 is circular.

In an embodiment, the spring support 312 is a cup washer having a front wall 316 which as a planar front face 316a, a planar rear face 316b, and a passageway 316c extending therethrough, and a wall 318 depending from the outer edge of the front wall 316. The wall 318 has a free rear end 318b. The wall forming the passageway 316c is unthreaded. A space 315 is formed by the walls 316, 318 surrounding the passageway 316c. In an embodiment, the walls 316, 318 are circular. The spring support 312 seats around the unthreaded portion 256 of the forward shaft 244 such that the forward shaft 244 extends through the passageway 316c. The spring 310 seats within the space 315 and the front face 310a of the spring 310 seats against the rear face 316b of the spring support 312. When the cable retention blocks 230 are in the radially outward position as described herein, the washer 308 partially seats within the space 315 and the spring 310 biases the spring support 312 into engagement with the lock 314. The wall 318 of spring support 312 prevents debris from entering the retaining assembly 306.

The lock 314 may be a conventional nut having a planar front face 314a, a planar rear face 314b, and a passageway 314c extending therethrough which is threadedly engaged with the threaded portion 258 of the forward shaft 244 such that the forward shaft 244 extends through the passageway 314c. The rear face 314b of the lock 314 abuts against the front face 316a of the spring support 312. Other forms of locks are within the scope of the present disclosure. For example, the lock 314 may be formed by a cotter pin which extends through an aperture in the forward shaft 244 and abuts against the front face 316a of the spring support 312, or the lock 314 may be formed by a weldment on the forward shaft 244 which is made after the other components are mounted on the forward shaft 244.

The blade position adjustment mechanism 236 is formed of a blade member 280, a spring-loaded fastener 282 threadedly attached to the blade member 280.

The blade member 280 has front and rear faces 280a, 280b, with upper, lower and side faces 280c, 280d, 280e extending therebetween. A cutting edge 286 is formed on the lower face 280d. A threaded passageway extends through the blade member 280 from the upper face 280c to the lower face 280d and the spring-loaded fastener 282 is mounted therein.

The fastener 282 is formed from a threaded shaft 292 having an enlarged head 294 at an end thereof. The shaft 292 seats through the slot 248 in the blade mount 242, through the threaded passageway in the blade member 280, and through the aperture 250 in the bottom wall 242f of the mount 242. As such, the blade member 280 is housed within the mount 242 and the cutting edge 286 extends into the passageway 228. The top end of the shaft 292 is secured to the blade mount 242 by a nut 296. The head 294 is proximate to the bottom wall 242f. A spring 298 surrounds the shaft 292, and is between the top side of wall 242f and the lower face 280d of the blade member 280. The bottom wall 242f may have a boss 300 surrounding the shaft 292 and the spring 298.

The positions of the gripping portions 268 of the cable retention blocks 230 are adjustable relative to the bushing 226 by rotating the mounting plate 240 around the forward shaft 244 to move the cable retention blocks 230 radially inwardly or outwardly relative to the rotational axis 222 of the cable stripper 220. The pins 272 slide along the grooves 276 in the mounting plate 240 which causes the cable retention blocks 230 to move radially inwardly or outwardly relative to the bushing 226.

In use, the cable retention blocks 230 and the cutting edge 286 of the blade member 280 are positioned such that they do not interfere, or at least substantially interfere, with the insertion of a cable into the passageway 228 of the cable stripper 220 through the forward shaft 244. To cause the movement of the cable retention blocks 230, the mounting plate 240 is rotated around the forward shaft 244 which causes the pins 272 to slide along the grooves 276. This causes the cable retention blocks 230 to move radially outwardly relative to the forward shaft 244. During this radially outwardly movement, the attachment portions 270 of the cable retention blocks 230 slide through the slots 262 in the forward shaft 244, but do not disengage from the grooves 276 in the mounting plate 240 or from engagement with the rear ends 262b of the slots 262. When the cable retention blocks 230 are in the radially outward position, the spring 310 biases the spring support 312 into engagement with the lock 314 and a space 317 may be formed between the free rear end 318b of the wall 318 of the spring support 312 and the front surface 40a of the mounting plate 240, and the spring 310 biases washer 308 into the engagement with the mounting plate 240, and biases the mounting plate 240 into engagement with the cable retention blocks 230.

The spring 310 generates a normal force which causes a frictional engagement with the washer 308 and thus with the mounting plate 240. In an embodiment, the washer 308 is eliminated and the spring 310 engages the mounting plate 240 such that the spring 310 generates a normal force which causes a frictional engagement with the mounting plate 240. It is to be understood that the positions of the mounting plate 240 and the cable retention blocks 230 can be reversed such that the mounting plate 240 is proximate to the mount 242 and the cable retention blocks 230 are between the mounting plate 240 and the flat washer 308 or spring 310.

To cause the movement of the blade member 280, the fastener 282 is rotated which causes the blade member 280 to translate along the shaft 292 of the fastener 282.

The cable is then inserted into the passageway 228 through the forward shaft 244, past the cable retention blocks 230 and into the rearward shaft 246. The beveled faces 268b on the cable retention blocks 230 will aid in guiding the cable into the passageway 228 formed between the cable retention blocks 230 if the cable engages one or more of the cable retention blocks 230.

Thereafter, the cable retention blocks 230 are moved to engage and hold the cable in the cable stripper 220. To cause the movement of the cable retention blocks 230, the mounting plate 240 is rotated in the opposite direction around the forward shaft 244 which causes the pins 272 to slide along the grooves 276 until the inner faces 268a of the gripping portions 268 engage the cable. The mounting plate 240 can be rotated with sufficient force to overcome the frictional engagement which results from the provision of the spring 310, thereby moving the cable retention blocks 230 radially inwardly relative to the forward shaft 244. During this radially inwardly movement, the attachment portions 270 of the cable retention blocks 230 slide through the slots 262 in the forward shaft 244, but do not disengage from the grooves 276 in the mounting plate 240 or from engagement with the rear ends 262b of the slots 262. The engagement of the spring support 312 with the lock 314 is maintained during this rotation.

Once the rotation of the mounting plate 240 is stopped, the frictional engagement which results from the engagement of the spring 310 with the washer 308 (if provided), the mounting plate 240 (or the cable retention blocks 230) fixes the rotational position of the mounting plate 240 and fixes the radial position of the cable retention blocks 230 relative to the forward shaft 244 such that further movement of the cable retention blocks 230 is prevented in a radially inward or radially outward direction.

To cause the movement of the blade member 280, the fastener 282 is then rotated in the opposite direction which causes the blade member 280 to translate linearly along the shaft 292 of the fastener 282 until the cutting edge 286 engages with the cable. Thereafter, the cable stripper 220 is rotated around the stationary cable to cut the insulation/jacket from the cable. As the cable stripper 220 is rotated around the stationary cable, a slight forward pressure is applied to provide the spiral cut along the length of the cable. As the cable stripper 220 rotates, the cutting edge 286 cuts into the insulation/jacket and removes it from the conductor. The removed insulation/jacket exits the cable stripper 220 via the slot 248. The passageway 228 formed by the cable retention blocks 230 holds the cable in sufficiently in place so the cutting edge 286 can maintain its position relative to the outer diameter of the cable, but the cable retention blocks 230 hold the cable loosely enough to permit rotation and axial movement of the cable relative to the cable stripper 220.

When the mounting plate 240 is rotated to move the cable retention blocks 230 radially outwardly, the mounting plate 240 can be rotated with sufficient force to overcome the frictional engagement which results from the provision of the spring 310, thereby moving the cable retention blocks 230 radially outwardly relative to the forward shaft 244. The engagement of the spring support 312 with the lock 314 is maintained during this rotation. Once the rotation of the mounting plate 240 is stopped, the frictional engagement which results from the engagement of the spring 310 with the washer 308 (if provided), the mounting plate 240 (or the cable retention blocks 230) fixes the rotational position of the mounting plate 240 and fixes the radial position of the cable retention blocks 230 relative to the forward shaft 244 such that further movement of the cable retention blocks 230 is prevented in a radially inward or radially outward direction.

It is to be understood that the position of the fastener 282 can be reversed such that the head 294 is proximate to the top wall 242e and the nut 296 is attached at the bottom wall 242f. Also, it is to be understood that a set screw 84 and a slot 52 can be provided like that of the embodiment shown in FIGS. 1-9.

Figure 26:
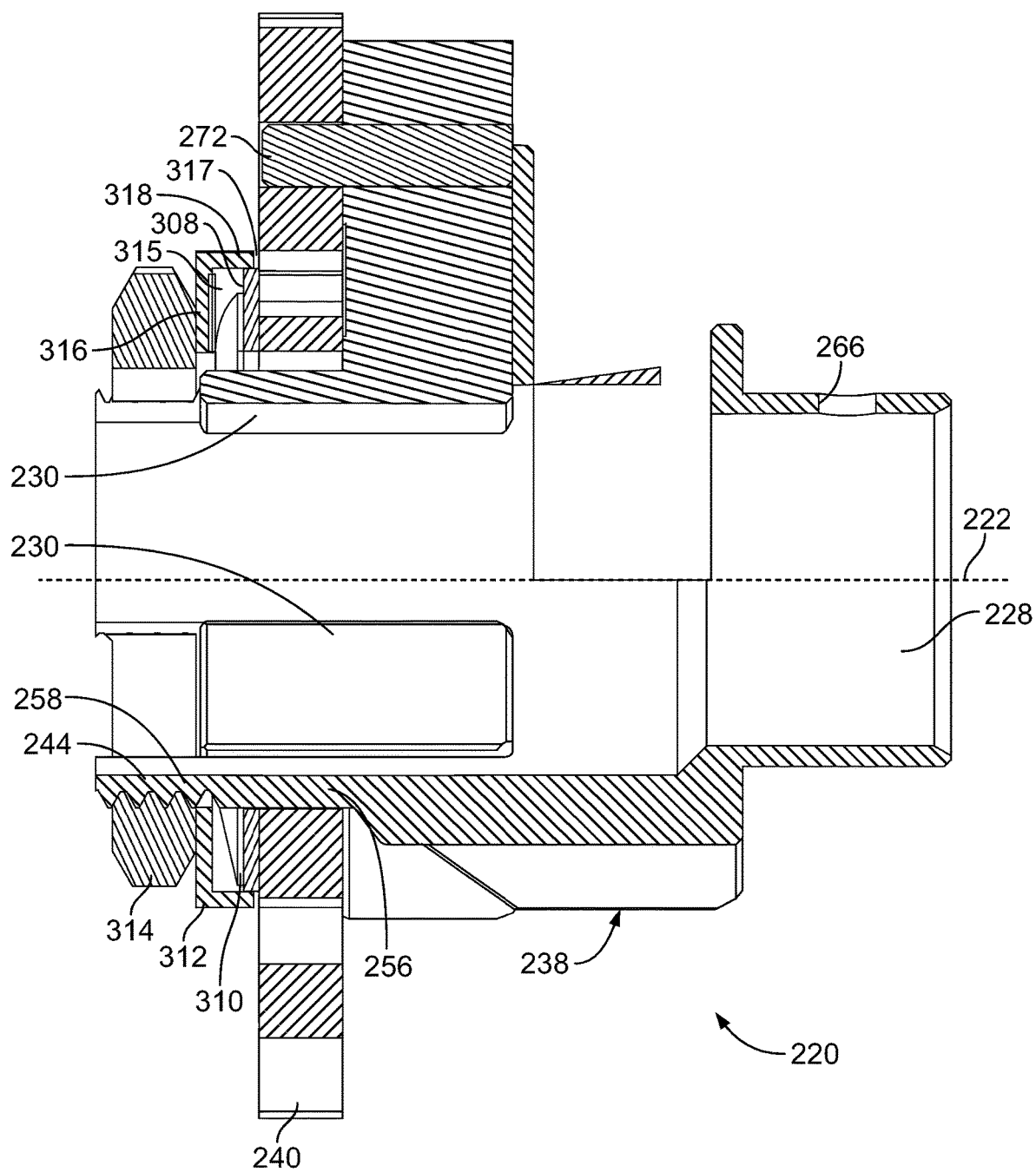
FIG. 26 is a cross-sectional view of the cable stripper of FIG. 21 along line 26-26 of FIG. 25.
Figure 26A:
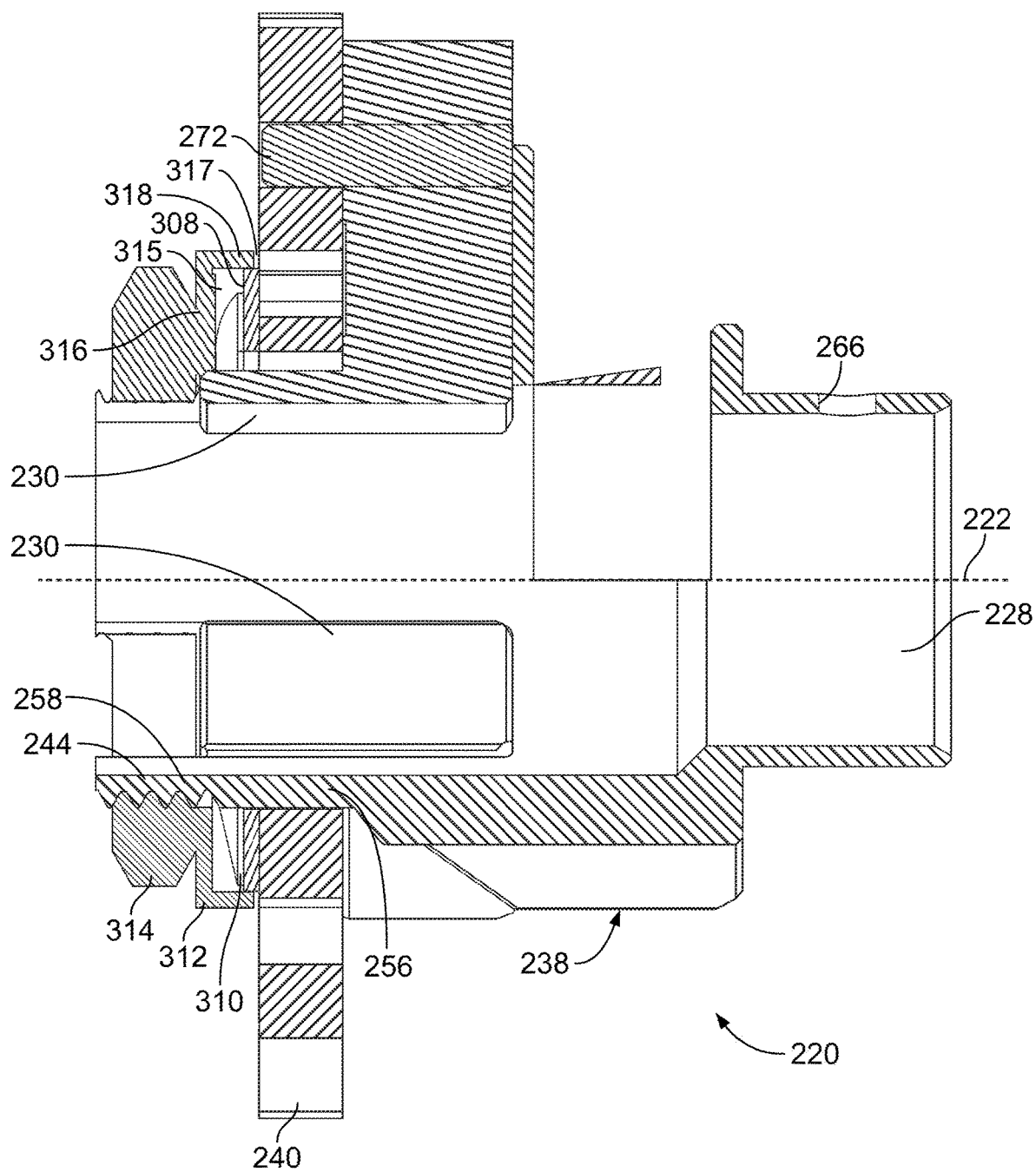
FIG. 26A is a cross-sectional view of the cable stripper of FIG. 21 like that of FIG. 26, but showing a spring support and a lock thereof as integrally formed.

In an embodiment, the spring support 312 is eliminated and the spring 310 engages directly against the lock 314. In an embodiment, the spring support 312 and the lock 314 are formed as two separate components. In an embodiment, the spring support 312 and the lock 314 are integrally formed as one piece as shown in FIG. 26A.

Figure 9:
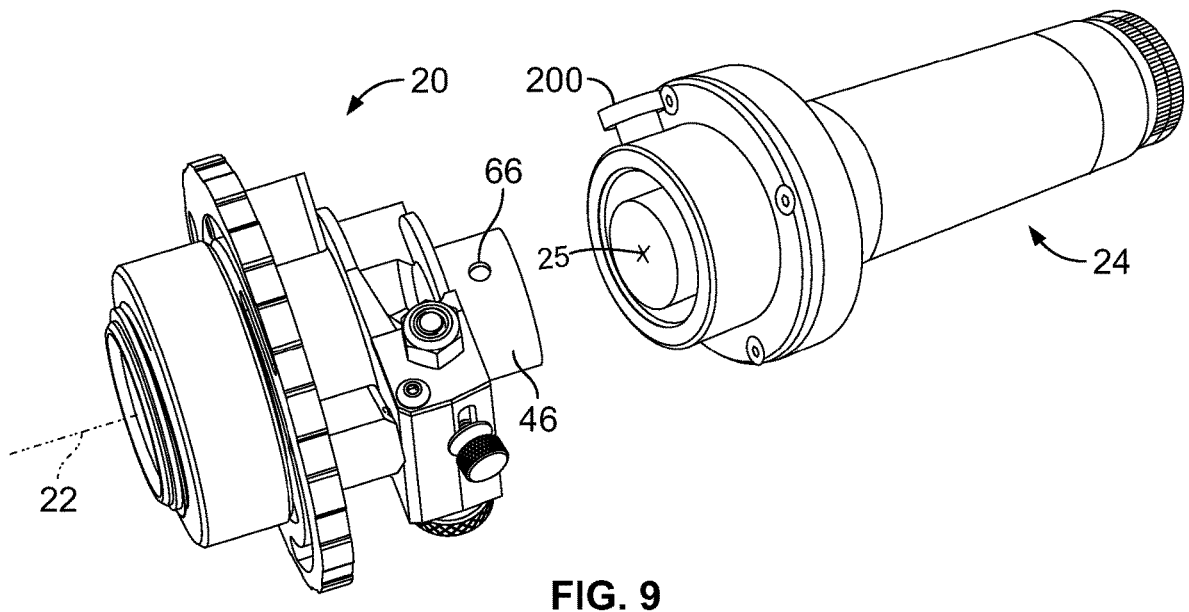
FIG. 9 is a front perspective view of the cable stripper of FIG. 1 shown exploded from an existing tool.
Figure 11:
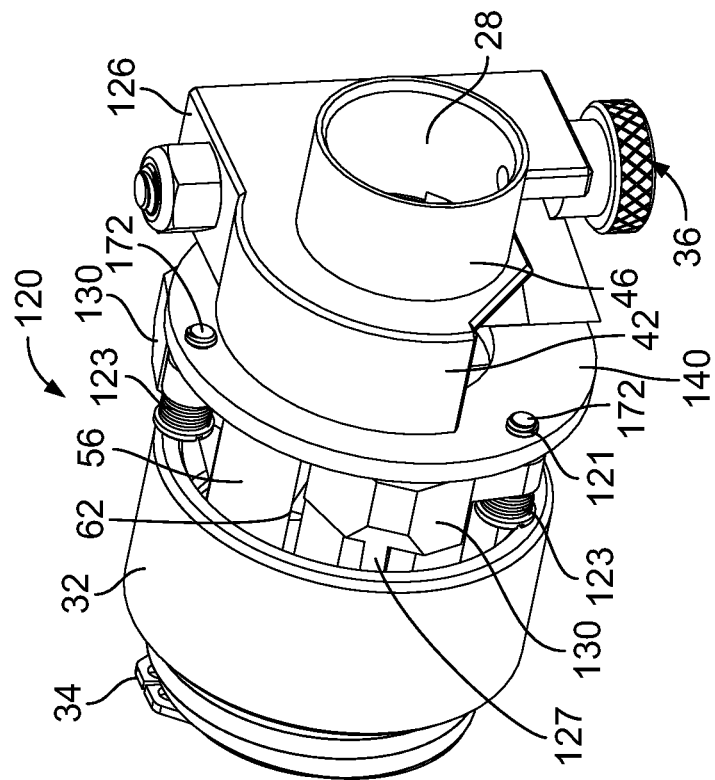
FIG. 11 is a rear perspective view of the cable stripper of FIG. 10.
Figure 10:
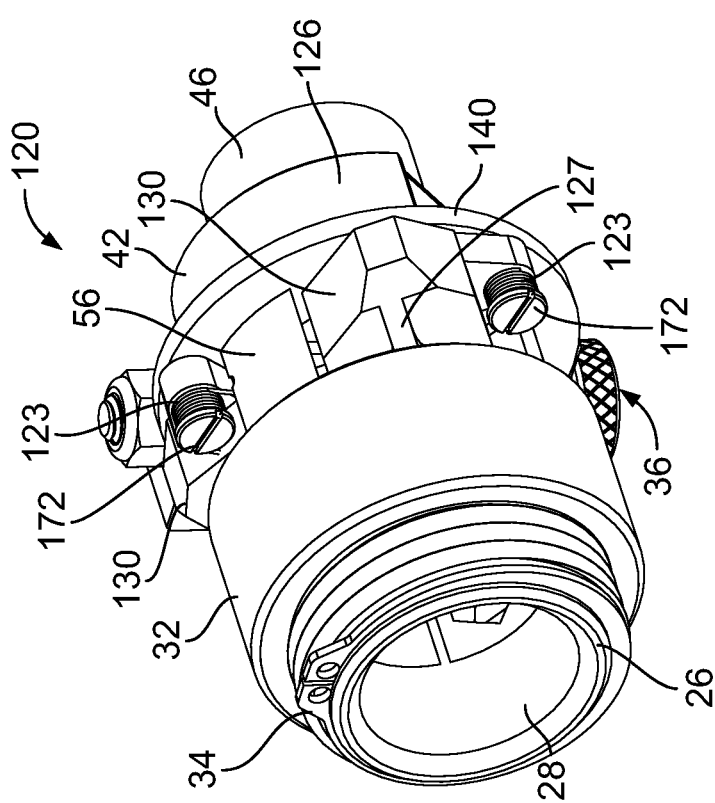
FIG. 10 is a front perspective view of a cable stripper.
Figure 12:
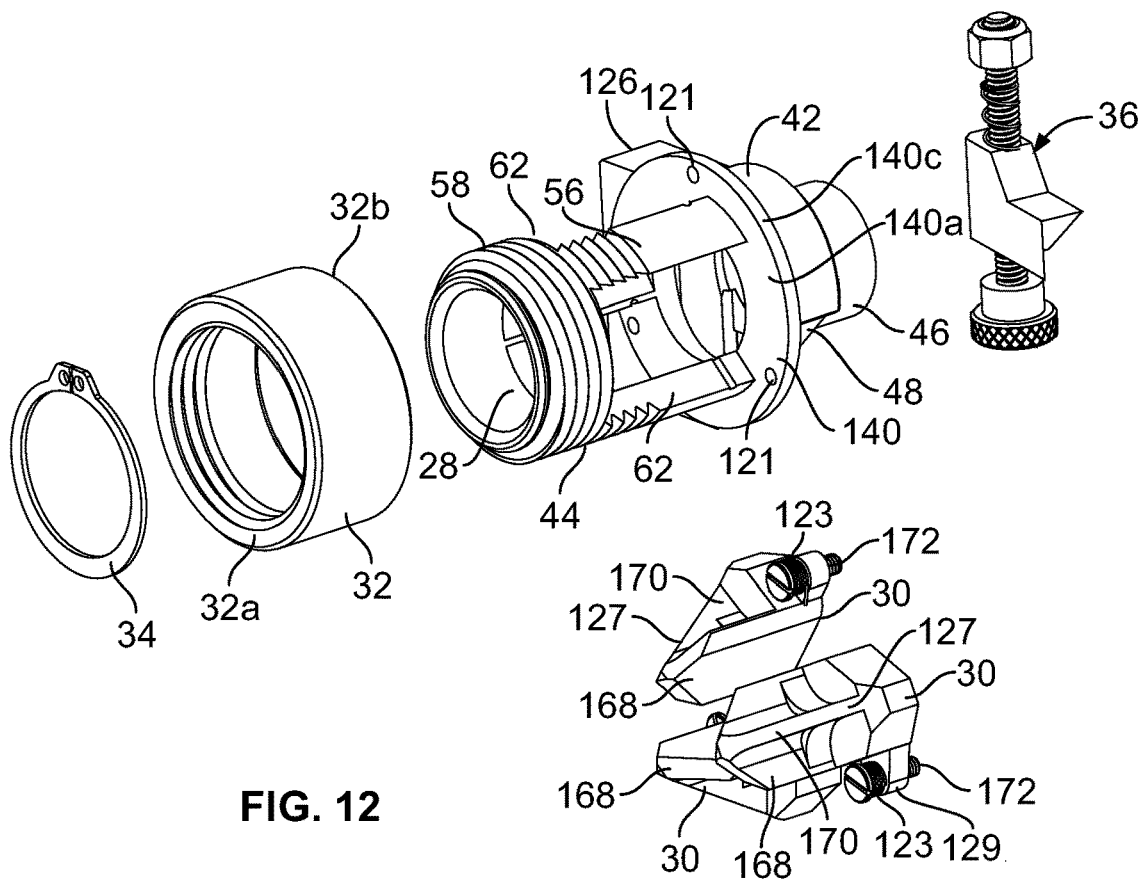
FIG. 12 is an exploded front perspective view of the cable stripper of FIG. 10.
Figure 13:
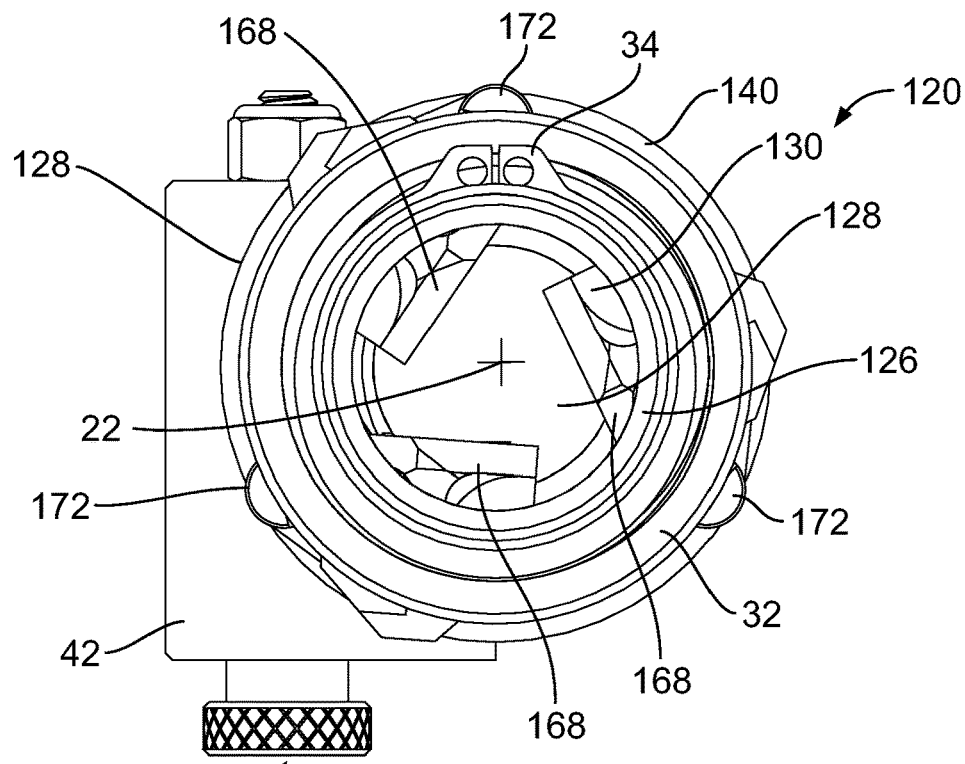
FIG. 13 is a front elevation view of the cable stripper of FIG. 10.
Figure 14:
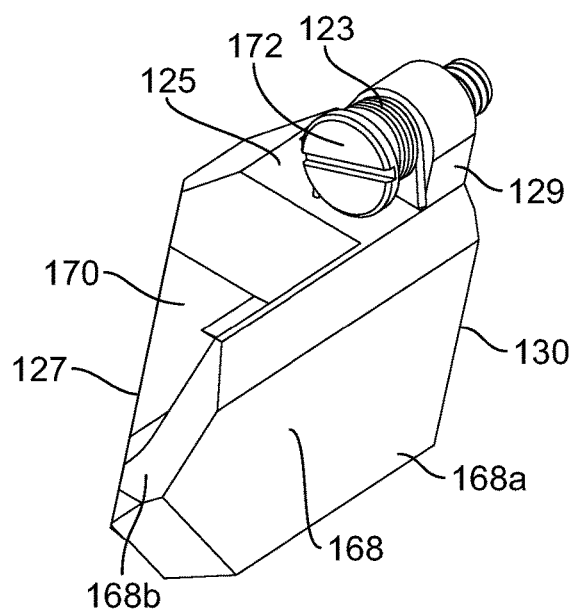
FIG. 14 is a front perspective view of a cable retention block of the cable stripper of FIG. 10.
Figure 15:
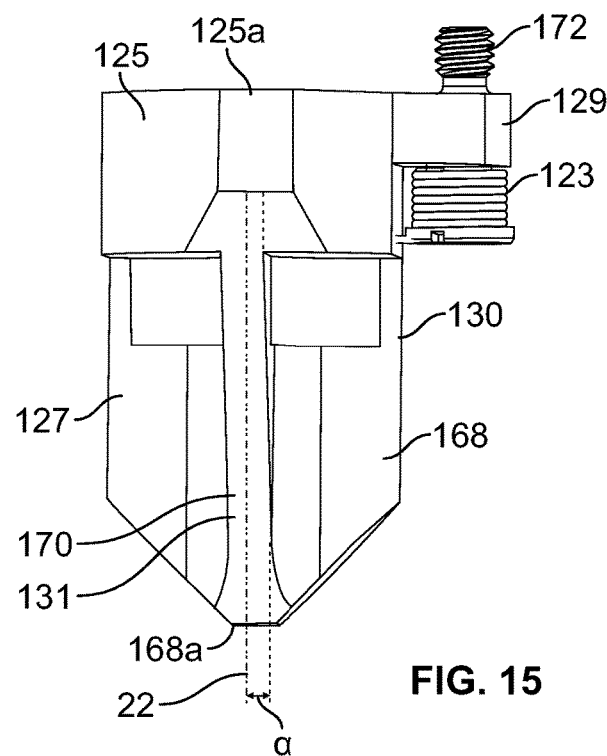
FIG. 15 is a top plan view of the cable retention block of FIG. 14.
Figure 16:
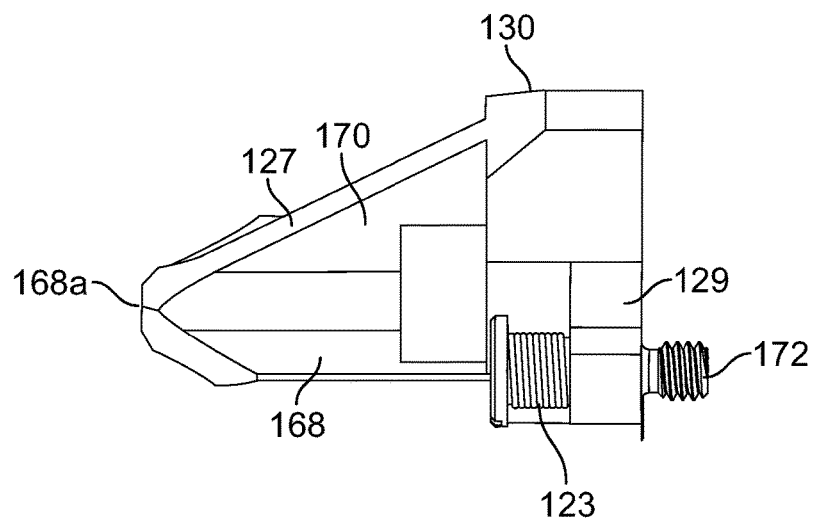
FIG. 16 is a side elevation view of the cable retention block of FIG. 14.
Figure 17:
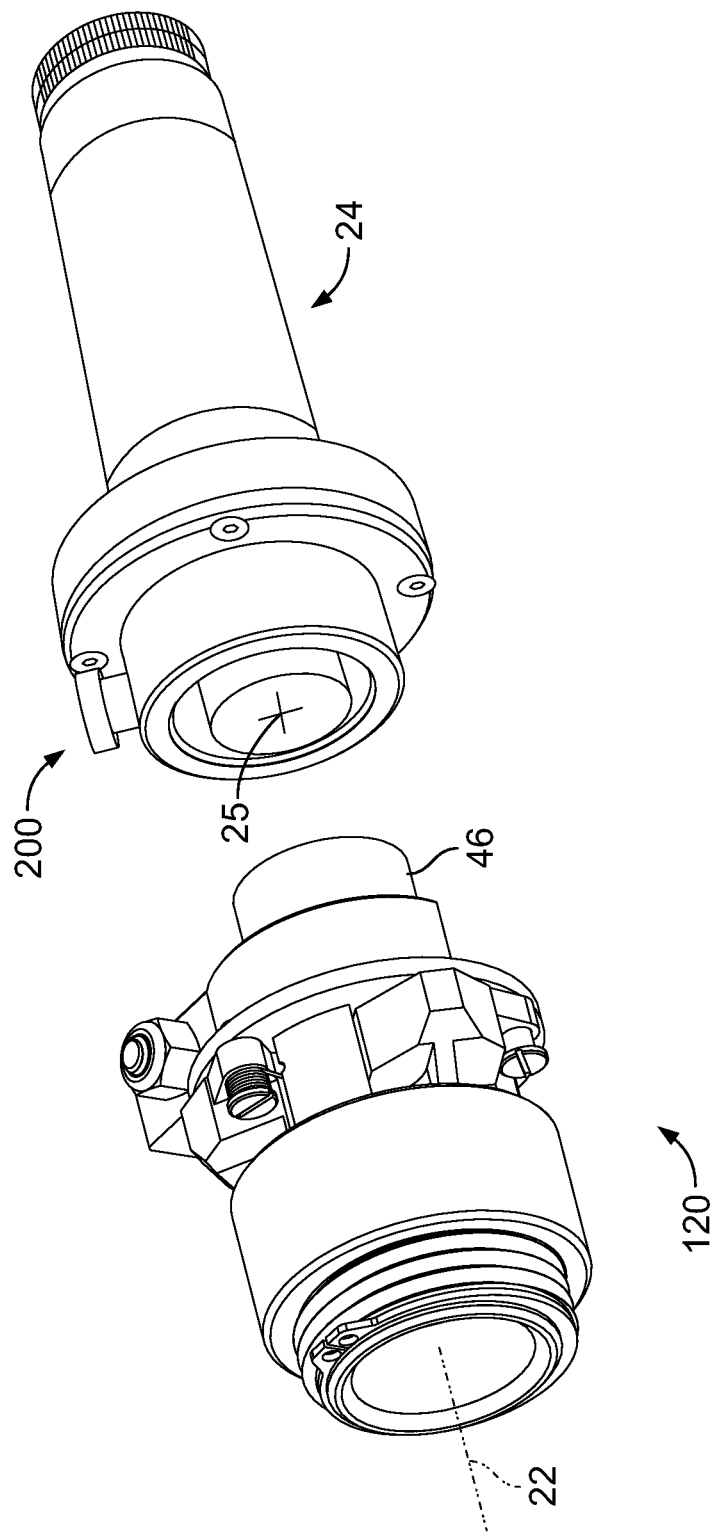
FIG. 17 is a front perspective view of the cable stripper of FIG. 10 shown exploded from an existing tool.
Figure 21:
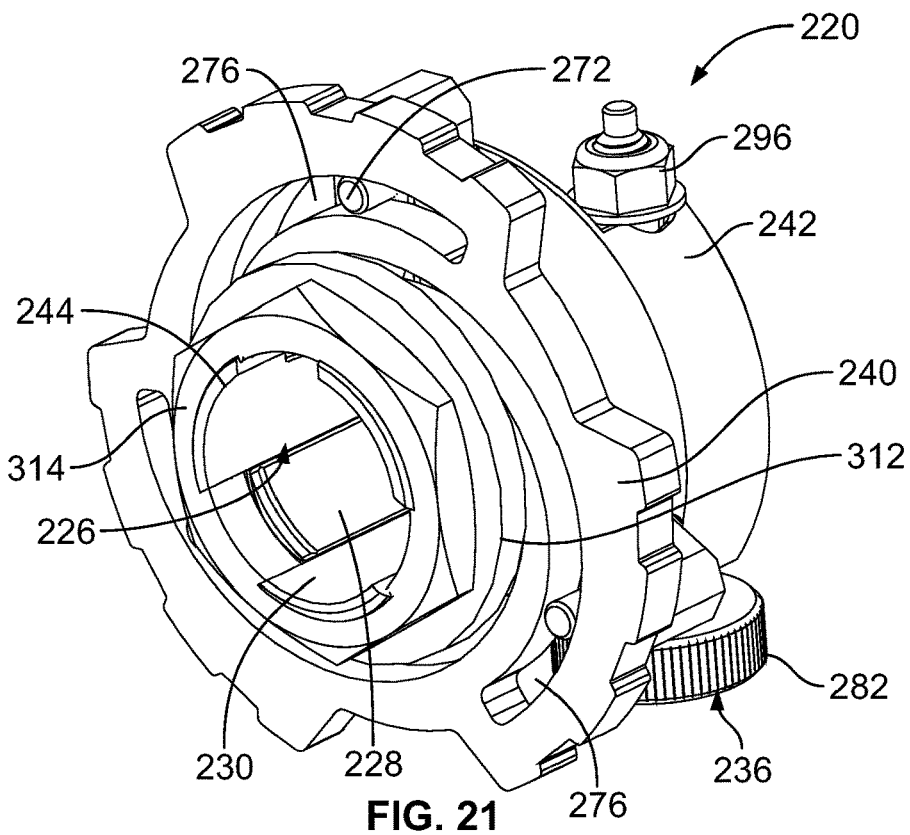
FIG. 21 is a front perspective view of an alternate cable stripper.
Figure 22:
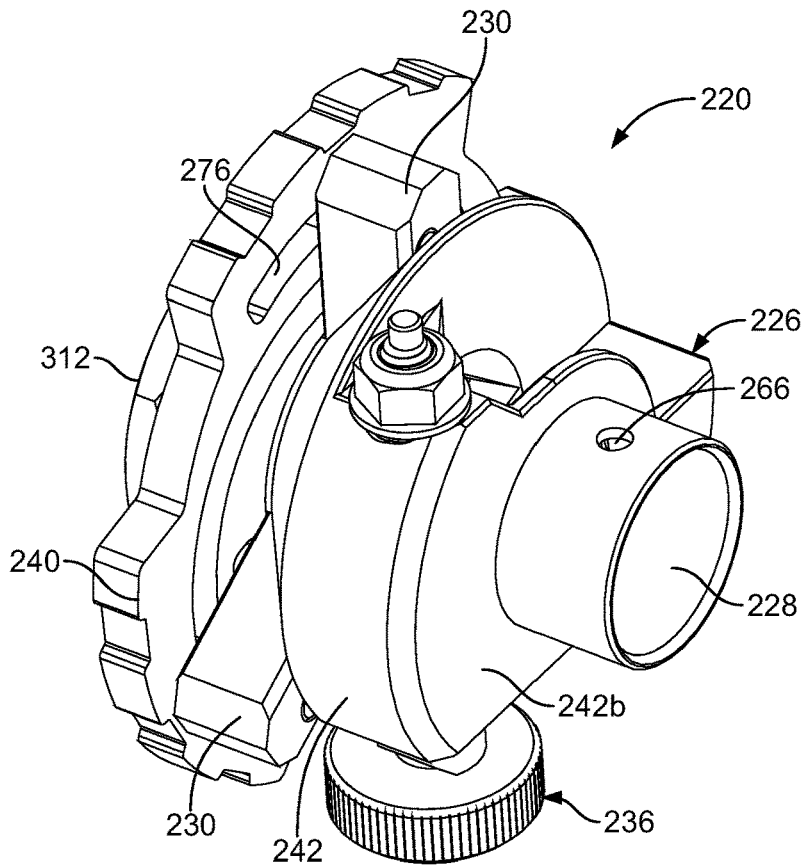
FIG. 22 is a rear perspective view of the cable stripper of FIG. 21.

As shown in FIGS. 9 and 17, an existing tool 24 can be easily and quickly attached to the rearward shaft 46 of the cable stripper 20, 120, 120', 220 to assist in the cable stripping process, for example because of the repetitive rotations required to fully strip the cable. Some existing tools 24 have a spring-loaded locking pin 200 that secures into the aperture 66 on the rearward shaft 46 of the bushing 26, 126. 226. As shown by way of example, the spring-loaded locking pin 200 can be inserted to easily and quickly attach the existing tool 24 by inserting the spring-loaded locking pin 200 through the aperture 66, 266. The rotational axis 25 of the existing tool 24 and the rotational axis 22 of the cable stripper 20, 120, 120', 220 are linearly aligned. As the cable stripper 20, 120, 120', 220 is rotated by the existing tool 24, the cutting edge 86, 286 cuts into the insulation/jacket and removes it from the conductor. The passageway 28, 228 formed by the cable retention blocks 30, 130, 130', 230 holds the cable in sufficiently in place so the cutting edge 86, 286 can maintain its position relative to the outer diameter of the cable, but the cable retention blocks 30, 130, 130', 230 hold the cable loosely enough to permit rotation and axial movement of the cable relative to the cable stripper 20, 120, 120', 220. The passageway 28, 228 formed by the cable retention blocks 30, 130, 130', 230 also keeps the cable centered relative to the rotational axis 25 of the attached existing tool 24.

Other structures for removably attaching the existing tool 24 to the cable stripper 20, 120, 120', 220 are within the scope of the present disclosure and the spring-loaded locking pin 200 is exemplary.

While FIGS. 9 and 17 show the ability to removably attach an existing tool 24 to the cable stripper 20, 120, 120', 220, it is to be understood that the existing tool 24 can be permanently attached to the rearward shaft 46, 246 of the cable stripper 20, 120, 120', 220, for example, but not limited to, by welding, adhesives.

Since the position of the cutting edge 86, 286 is adjustable, this allows the cutting edge 86, 286 to be positioned to match any size cable, plus any size of insulation/jacket that needs to be stripped from the conductor of the cable. The cutting edge 86, 286 is angled to cut into the insulation/jacket at an angle, and produce a spiral cut up the length of the cable when the cable stripper 20, 120, 120', 220 is operated.

It is to be understood that one or more of the cable retention blocks 130' and elongated slots 121' of the cable stripper 120' can be used in the cable stripper 120 such that some of the cable retention blocks 130' slide relative to the bushing 126 as shown in the cable stripper 120', and others of the cable retention blocks 130 pivot relative to the bushing 126 as shown in the cable stripper 120.

The cable stripper 20, 120, 120', 220 provides a user with the ability to adjust the size of the opening that is used to contact the cable, and provides the user with the ability to adjust the blade height to accommodate different cable insulation/jacket thicknesses. The cable stripper 20, 120, 120', 220 can also be connected to existing cable stripping tools, such as ratcheting handles and adapters for drills. Therefore, the cable stripper 20, 120, 120', 220 eliminates the need for a user to deal with selecting an exactly sized bushing 26, 126, 226 and blade depth, and instead allows for one adjustable cable stripper 20, 120, 120', 220 to be connected to or permanently attached to an existing tool 24 to complete the cable stripping.

As a result of this structure of the cable stripper 20, 120, 120', 220, the size of the passageway 28, 228 formed by the cable retention blocks 30, 130, 130', 230' and through which the cable extends is easily and quickly adjusted to accommodate differently sized cables.

Many modifications and other embodiments of the inventions set forth herein will come to mind to one skilled in the art to which these disclosed embodiments pertain having the benefit of the teachings presented in the foregoing descriptions and the associated drawings. Therefore, it is to be understood that the disclosure is not to be limited to the specific embodiments disclosed herein and that modifications and other embodiments are intended to be included within the scope of the disclosure. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure.

Although specific terms are employed herein, they are used in a generic and descriptive sense only and not for purposes of limitation.

What is claimed is:

1. A cable stripper capable of stripping insulation from a cable, the cable stripper comprising:
    a housing comprising a shaft having a passageway extending axially therethrough and a plurality of spaced slots provided therethrough and in communication with the passageway;
    an assembly comprising a mounting plate rotationally attached to the shaft, and a plurality of cable retention blocks attached to the shaft and to the mounting plate, the cable retention blocks being movable radially inwardly and outwardly in the slots and into the passageway and being movably attached to the mounting plate; and
    a spring mounted on the shaft and engaged with the assembly, the spring biasing the assembly into engagement with the housing;
    a spring support mounted on the shaft and engaged with the spring;
    a lock mounted on the shaft and proximate to the spring support, the lock preventing outward movement of the spring on the shaft; and
    a blade member mounted on the housing, the blade member extending into the passageway.

2. The cable stripper of claim 1, further comprising a washer mounted on the shaft between the spring and the assembly.

3. The cable stripper of claim 1, wherein the spring support is a cup washer.

4. The cable stripper of claim 1, wherein the lock is a lock nut threadedly engaged with the shaft.

5. The cable stripper of claim 1, wherein the spring is a wave spring.

6. The cable stripper of claim 5, wherein the spring support is a cup washer and the spring seats within the cup washer.

7. The cable stripper of claim 1, wherein the spring is a compressible elastomeric member.

8. The cable stripper of claim 7, wherein the spring support is a cup washer and the spring seats within the cup washer.

9. The cable stripper of claim 7, wherein the blade member is movably mounted on the housing.

10. The cable stripper of claim 1, wherein the mounting plate includes a plurality of partially spiral shaped grooves, each cable retention block having a pin which is seated within one of the respective grooves and slideable within the respective groove.

11. The cable stripper of claim 1, wherein the housing further comprises a blade mount, the shaft extending from a first end of the blade mount, a shaft extending from a second end of the blade mount, the passageway extending through the shaft of the housing, the blade mount and the shaft extending from the second end of the blade mount, the blade member being mounted in the blade mount.

12. The cable stripper of claim 1, wherein the spring support and the lock are integrally formed.

13. The cable stripper of claim 1, wherein the spring support and the lock are two separate components.

14. The cable stripper of claim 1 in combination with a tool for rotating the cable stripper relative to a stationary cable.

15. The combination of claim 14, wherein a rotational axis of the tool and a rotational axis of the cable stripper are linearly aligned.

16. The combination of claim 14, wherein the housing includes an aperture and the tool includes a spring-loaded pin which is engageable with the aperture for mating the tool and the cable stripper together.

* * * * *